United States Patent
Nakano et al.

(10) Patent No.: US 11,516,361 B2
(45) Date of Patent: Nov. 29, 2022

(54) IMAGE FORMING APPARATUS AND IMAGE FORMING METHOD

(71) Applicant: SEIKO EPSON CORPORATION, Tokyo (JP)

(72) Inventors: Tomoyuki Nakano, Shiojiri (JP); Yoshiaki Shibasaki, Azumino (JP); Tomoyuki Kurata, Matsumoto (JP); Kazunobu Nimura, Tatsuno-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/405,928

(22) Filed: Aug. 18, 2021

(65) Prior Publication Data

US 2022/0060596 A1  Feb. 24, 2022

(30) Foreign Application Priority Data

Aug. 21, 2020 (JP) .............................. JP2020-139957

(51) Int. Cl.
  *H04N 1/00* (2006.01)
(52) U.S. Cl.
  CPC ..... *H04N 1/00864* (2013.01); *H04N 1/00602* (2013.01); *H04N 1/00652* (2013.01)
(58) Field of Classification Search
  CPC .. H01L 2224/73253; H01L 2924/1815; H04N 1/00602; H04N 1/00652; H04N 1/00864; H04N 1/32203; H04N 1/32208; H04N 1/32309; H04N 1/2112; H04N 1/32267; H04N 1/387; H04N 2201/3205; H04N 2201/3271; H04N 2201/3281;
(Continued)

(56) References Cited

U.S. PATENT DOCUMENTS 9,871,943 B1 * 1/2018 Hashizume ........ H04N 1/32192
2006/0222352 A1 * 10/2006 Kawase ............. G03G 15/5087
396/15
(Continued)

FOREIGN PATENT DOCUMENTS

JP  2017065009 A  4/2017

*Primary Examiner* — Negussie Worku
(74) *Attorney, Agent, or Firm* — Chip Law Group

(57) ABSTRACT

An image forming apparatus that forms an output image including an authentication image for authenticity determination on a medium. The image forming apparatus includes: a recording head configured to discharge a droplet onto the medium; a drive unit configured to perform main scanning in which the recording head moves in a main scanning direction and sub scanning in which the medium is fed in a feeding direction; and a control unit configured to control, based on image formation data representing the output image, the main scanning and the sub scanning performed by the drive unit, and the discharge of the droplet performed by the recording head. The control unit performs a control to form the authentication image by a plurality of times of the main scanning in which feeding positions of the medium in the feeding direction are different, and performs a control so that at least one feeding amount of the medium in one sub scanning is different between a feeding amount at time of forming the authentication image and a feeding amount at time of forming a portion of the output image that does not include the authentication image.

7 Claims, 13 Drawing Sheets

(58) Field of Classification Search
CPC ............ H04N 1/32251; H04N 1/32293; G06T 1/0028; G06T 2201/0051; G06T 2201/0083; G06T 1/005; G06T 2201/0061; Y10T 428/24901; Y10T 428/24802; B41J 31/00; B41M 3/14; B41M 3/148; B41M 5/26; B41M 5/30; B41M 5/345; B41M 5/385; B42D 25/00; B42D 25/328; B42D 25/378; B44C 1/16; G02B 5/1842; G02B 5/32; G03H 2001/0497; G07D 7/003; G07D 7/202; G09F 3/0292; A47G 19/02; G01F 19/002; G06K 19/077; G06K 19/14; G06K 19/145; G06K 19/18
USPC ........................................................ 358/1.1
See application file for complete search history.

(56) References Cited

U.S. PATENT DOCUMENTS

| | | | | |
|---|---|---|---|---|
| 2010/0124355 | A1* | 5/2010 | Saito .................. | H04N 1/00864 348/222.1 |
| 2013/0139240 | A1* | 5/2013 | Sawayanagi ............ | G06F 21/41 726/8 |
| 2014/0192128 | A1* | 7/2014 | Arima .................. | B41M 7/0009 347/179 |
| 2015/0092220 | A1* | 4/2015 | Matsunaga ........ | G06K 15/4095 358/1.14 |
| 2020/0288024 | A1* | 9/2020 | Yamaguchi ........ | H04N 1/00411 |
| 2021/0227087 | A1* | 7/2021 | Ozaki ................ | H04N 1/00854 |

\* cited by examiner

FIG. 13

|  | NORMAL IMAGE | AUTHENTICATION IMAGE |
|---|---|---|
| CASE 1 | C, M, Y, K, CL | Y, CL |
| CASE 2 | C, M, Y, K | CL |
| CASE 3 | C, M, Y, K | Y, CL |
| CASE 4 | C, M, Y, K | Y |
| CASE 5 | C, M, Y, K, Lc, Lm | Y, Lc, Lm |

IMAGE FORMING APPARATUS AND IMAGE FORMING METHOD

The present application is based on, and claims priority from JP Application Serial Number 2020-139957, filed Aug. 21, 2020, the disclosure of which is hereby incorporated by reference herein in its entirety.

BACKGROUND

1. Technical Field

The present disclosure relates to an image forming apparatus that forms an output image including an authentication image for authenticity determination on a medium, and an image forming method.

2. Related Art

To prevent a fake printed material from being distributed, an output image including an authentication image for authenticity determination is formed on a medium. JP-A-2017-65009 discloses a plurality of print media to be posted on a product, on which a print pattern for authenticity determination is printed together with a product logo. On a base sheet for forming the plurality of print media, the print pattern is formed by a pair of printing rollers, and the product logo is formed by another pair of printing rollers. The printed base sheet is cut on a print medium basis.

When the plurality of print media are formed by, for example, the same individual printing apparatus, the plurality of print media are formed with the same print pattern. When the same individual printing apparatus is used for creating a fake print of the print media, authenticity of the print media cannot be determined. In such a case, anti-counterfeit measures are also required.

SUMMARY

An image forming apparatus according to the present disclosure is an apparatus that forms an output image including an authentication image for authenticity determination on a medium. The image forming apparatus includes: a recording head configured to discharge a droplet onto the medium; a drive unit configured to perform main scanning in which the recording head moves in a main scanning direction and sub scanning in which the medium is fed in a feeding direction; and a control unit configured to control, based on image formation data representing the output image, the main scanning and the sub scanning performed by the drive unit, and the discharge of the droplet performed by the recording head. The control unit performs a control to form the authentication image by a plurality of times of the main scanning in which feeding positions of the medium in the feeding direction are different, and performs a control so that at least one feeding amount of the medium in one sub scanning is different between a feeding amount at time of forming the authentication image and a feeding amount at time of forming a portion of the output image that does not include the authentication image.

An image forming method according to the present disclosure is a method for forming an output image including an authentication image for authenticity determination on a medium by performing main scanning in which a recording head that discharges a droplet onto the medium moves in a main scanning direction and sub scanning in which the medium is fed in a feeding direction. The image forming method includes forming the authentication image by a plurality of times of the main scanning in which feeding positions of the medium in the feeding direction are different. At least one feeding amount of the medium in one sub scanning is different between a feeding amount at time of forming the authentication image and a feeding amount at time of forming a portion of the output image that does not include the authentication image.

BRIEF DESCRIPTION OF THE DRAWINGS

FIG. 13 is a diagram schematically showing types of a liquid for forming the normal image and types of a liquid for forming the authentication image.

DESCRIPTION OF EXEMPLARY EMBODIMENTS

Figure 1:
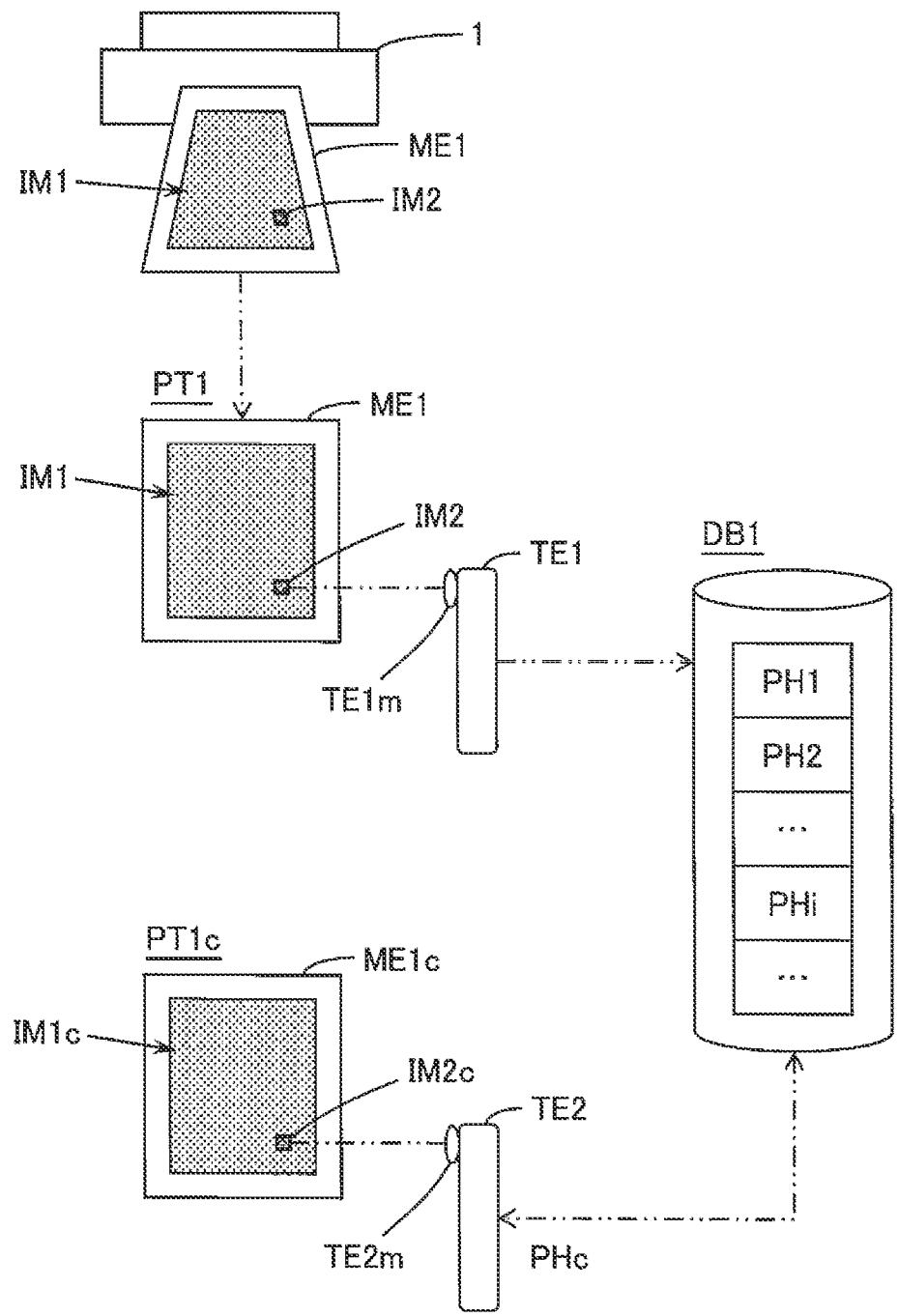
FIG. 1 is a diagram schematically showing an example of an authenticity determination system.

Hereinafter, embodiments of the present disclosure will be described. It is for sure that the following embodiments are merely examples of the present disclosure, and all features shown in the embodiments are not necessarily essential to the solution of the present disclosure.

(1) Outline of Technique Included in Present Disclosure

First, an outline of a technique included in the present disclosure will be described with reference to examples shown in FIGS. 1 to 13. It should be noted that the drawings of the present application are diagrams schematically showing examples, enlargement ratios in respective directions shown in these drawings may be different from each other, and the respective drawings may not be consistent with each other. It is for sure that elements of the present technique are not limited to specific examples indicated by the reference numerals. In the "Outline of Technique Included in Present Disclosure", a parenthesis means a supplementary explanation of an immediately preceding word.

Further, in the present application, a numerical range "Min to Max" means not less than a minimum value Min and not more than a maximum value Max.

Aspect 1

An image forming apparatus 1 according to an aspect of the present technique forms an output image IM1 including an authentication image IM2 for authenticity determination on a medium ME1, and includes a recording head 30, a drive unit 50, and a control unit (for example, a controller 10). The recording head 30 discharges droplets 37 onto the medium ME1. The drive unit 50 performs main scanning in which the recording head 30 moves in a main scanning direction D1 and sub scanning in which the medium ME1 is fed in a feeding direction D2. The control unit (10) controls the main scanning and the sub scanning performed by the drive unit 50 and the discharge of the droplets 37 performed by the recording head 30 based on image formation data DA1 representing the output image IM1. As shown in FIGS. 5 to 8, the control unit (10) performs a control to form the authentication image IM2 by a plurality of times of the main scanning in which feeding positions of the medium ME1 in the feeding direction D2 are different, and performs a control so that at least one feeding amount F of the medium ME1 in one sub scanning is different between a feeding amount at the time of forming the authentication image IM2 and a feeding amount at the time of forming a portion of the output image IM1 that does not include the authentication image IM2.

In the aspect described above, a feeding amount F2 of the medium ME1 when the authentication image IM2 is formed is different from a feeding amount F1 of the medium ME1 when the portion of the output image IM1 that does not include the authentication image IM2 is formed, and thus a variation in positions of dots DT1 generated from the droplets 37 at the time of forming the authentication image is generated. Therefore, even when the same individual image forming apparatus 1, that is, the image forming apparatus 1 itself that forms the output image including the authentication image is used for copying, it is difficult to form the same authentication image IM2. Therefore, the above aspect can provide an image forming apparatus capable of forming an output image including an authentication image that is more difficult to copy on a medium.

Here, the portion of the output image excluding the authentication image is referred to as a normal image. The authentication image may be within a region of the normal image, and may be outside the region of the normal image.

The feeding amount when the authentication image is formed is a feeding amount when the authentication image is formed in both the main scanning in which recording is performed immediately before the medium is fed and the main scanning in which recording is performed immediately after the medium is fed. The feeding amount when the portion of the output image that does not include the authentication image is formed is a feeding amount when the portion of the output image that does not include the authentication image is formed in both the main scanning in which the recording is performed immediately before the medium is fed and the main scanning in which the recording is performed immediately after the medium is fed.

The above-described additional statements are also applied to the following aspects.

Aspect 2

Figure 8:
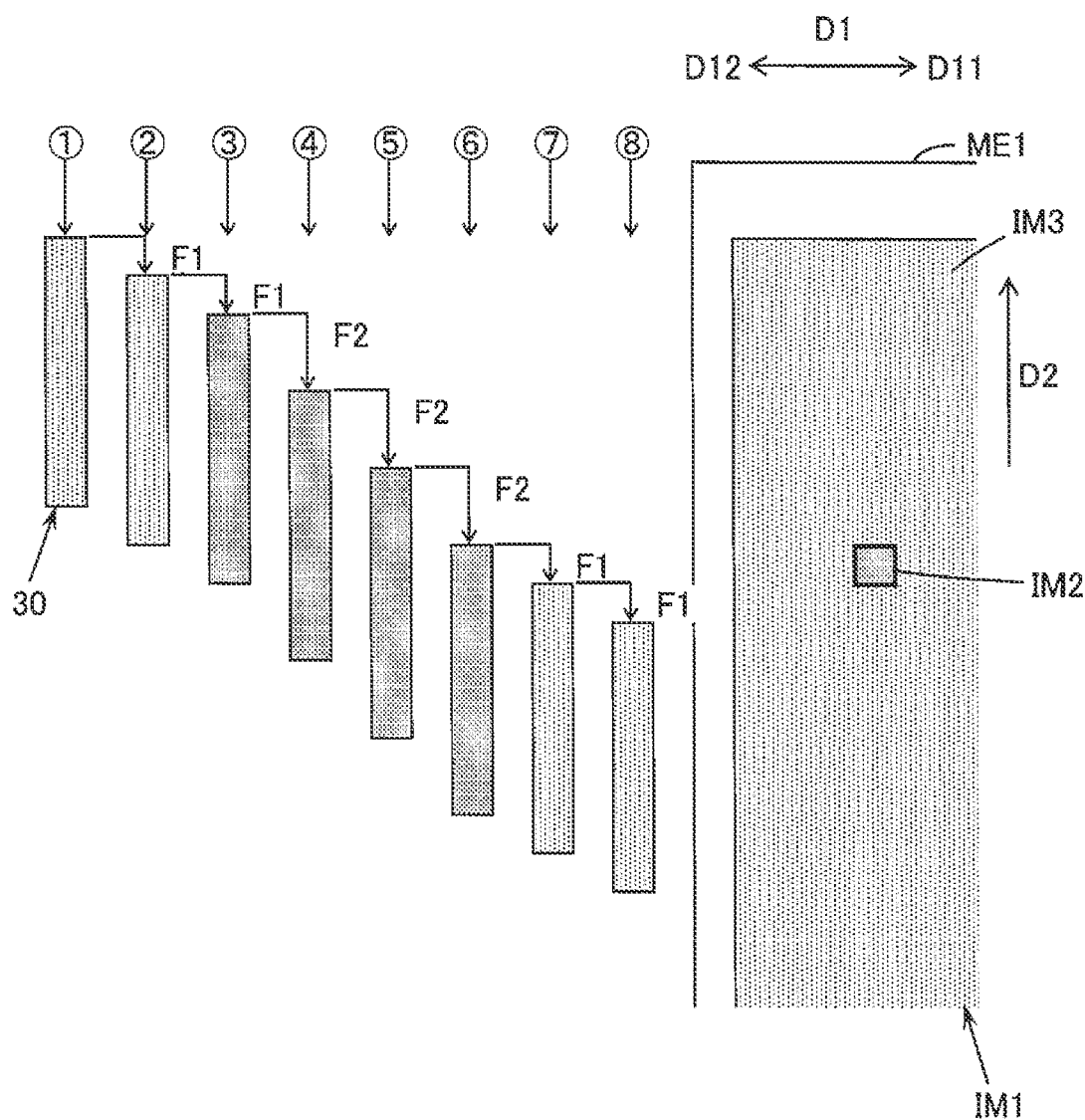
FIG. 8 is a diagram schematically showing an example in which a feeding amount at the time of forming the authentication image changes.
Figure 9:
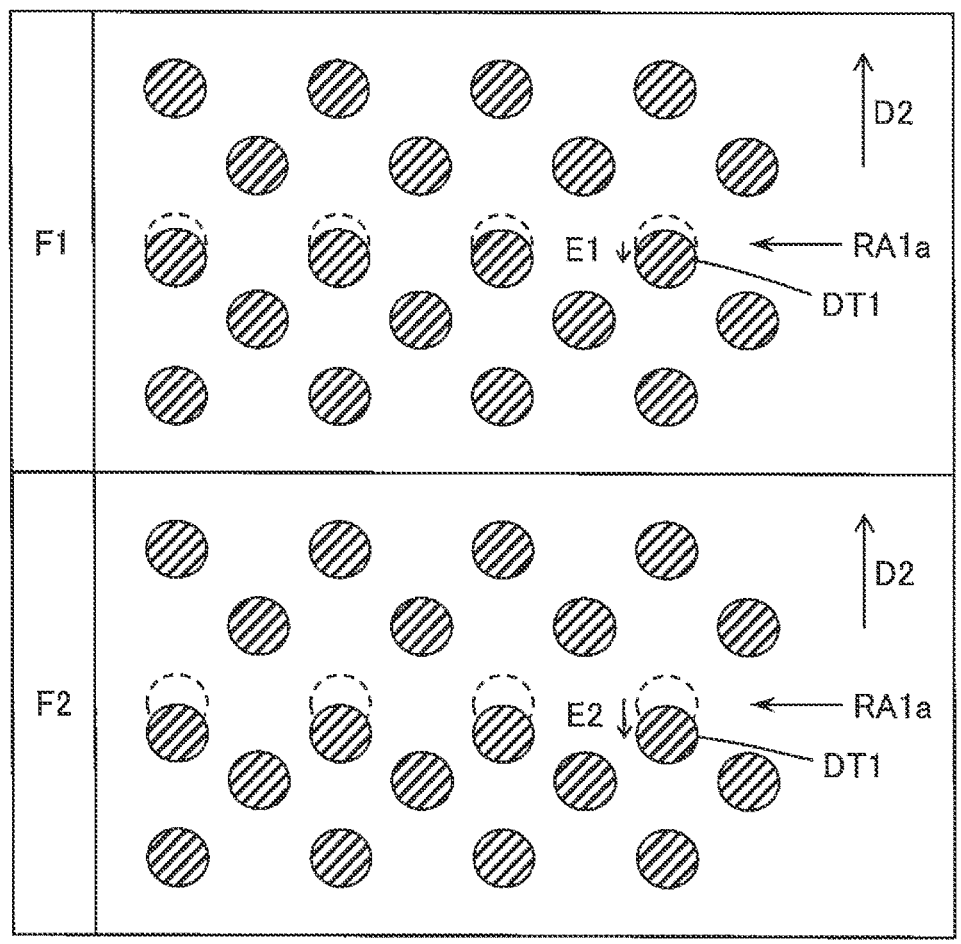
FIG. 9 is a diagram schematically showing an example in which a positional variation of dots increases in the authentication image.

As shown in FIG. 8 and the like, the control unit (10) may perform a control so that the feeding amount F2 when the authentication image IM2 is formed is larger than the feeding amount F1 when the portion of the output image IM1 that does not include the authentication image IM2 is formed. As shown in FIG. 9, when the feeding amount F of the medium ME1 increases, a feeding error of the medium ME1 increases at the time of forming the authentication image, and thus a positional variation of the dots DT1 tends to increase. Therefore, the present aspect can form an output image including an authentication image that is more difficult to copy on a medium.

Aspect 3

Figure 11:
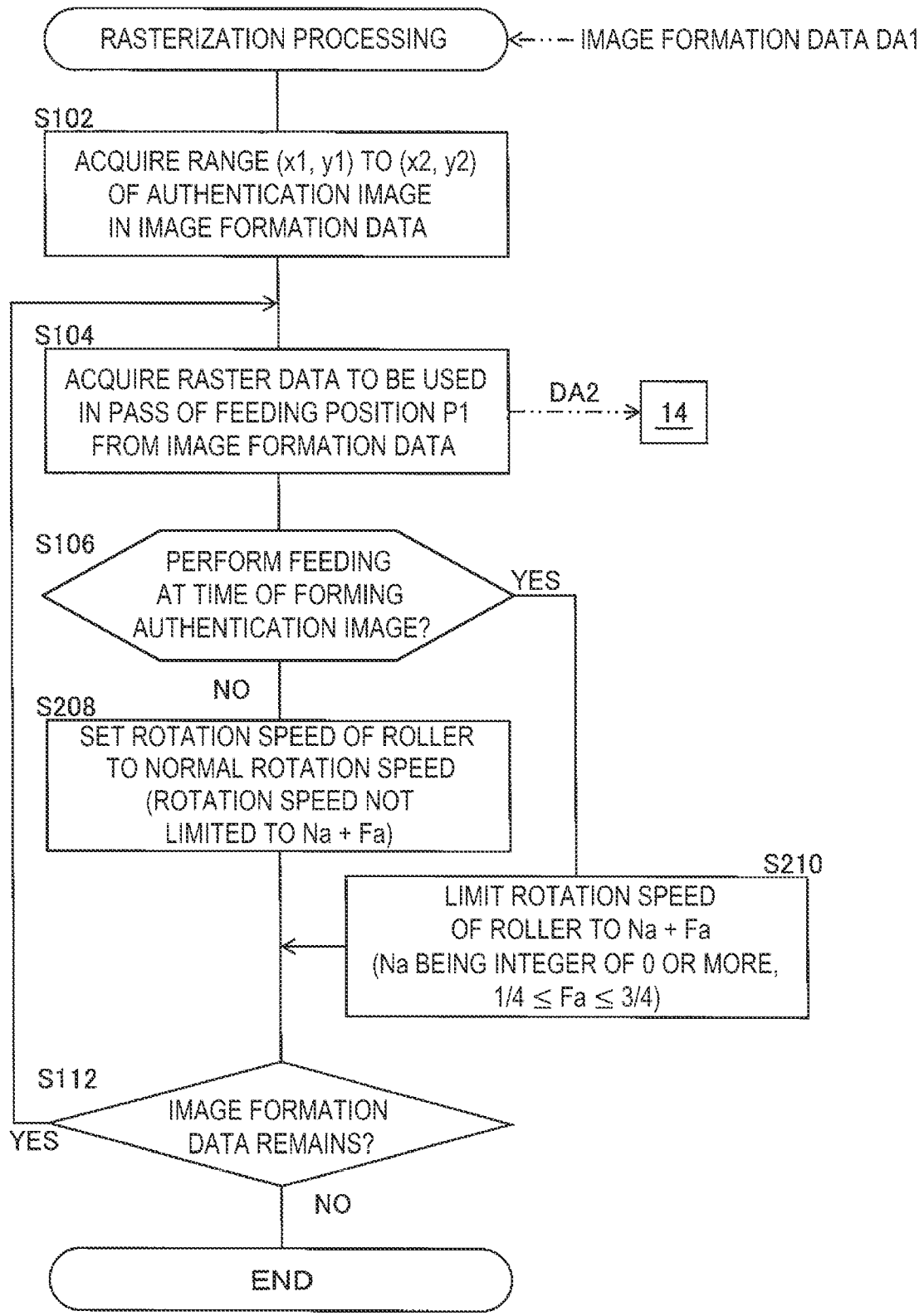
FIG. 11 is a flowchart showing another example of the rasterization processing.

The drive unit 50 may include a roller (for example, rollers 56a, 57a) that rotates to feed the medium ME1 in the feeding direction D2. Here, N is set to an integer of 0 or more, Fa is set to a number of ¼ or more and ¾ or less. As shown in FIG. 11 and the like, the control unit (10) may limit a rotation speed of the roller (56a, 57a) that corresponds to the feeding amount F at the time of forming the authentication image IM2 to Na+Fa, and may not limit a rotation speed of the roller (56a, 57a) that corresponds to the feeding amount F at the time of forming the portion of the output image IM1 that does not include the authentication image IM2 to Na+Fa. Since most rotation shafts of mass-produced rollers (56a, 57a) have slight eccentricity, at the time of forming the authentication image, that the rotation speed of the roller (56a, 57a) that corresponds to the feeding amount F being Na+Fa tends to increase the positional variation of the dots DT1. Therefore, the present aspect can form an output image including an authentication image that is more difficult to copy on a medium.

Aspect 4

Figure 12:
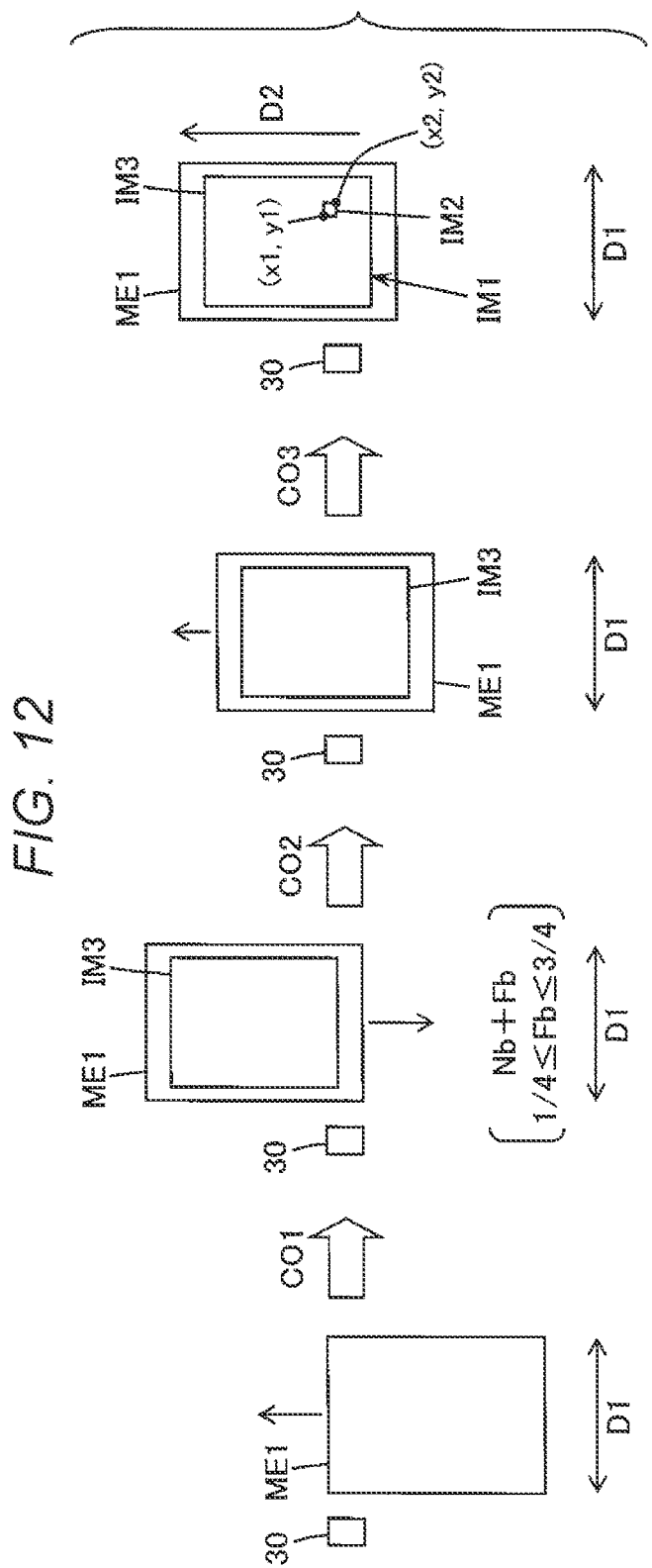
FIG. 12 is a diagram schematically showing an example in which the authentication image is formed on the medium after back-feeding.

As shown in FIG. 12, the control unit (10) may perform a first control CO1 to form the output image IM1 excluding the authentication image IM2 on the medium ME1, perform a second control CO2 to back-feed the medium ME1 after the first control CO1, and perform a third control CO3 to form the authentication image IM2 on the medium ME1 after the second control CO2. When the medium ME1 is back-fed, an error is likely to occur in the feeding position of the medium ME1, and thus the positional variation of the dots DT1 tends to increase. Therefore, the present aspect can form an output image including an authentication image that is more difficult to copy on a medium.

Aspect 5

Here, Nb is set to an integer of 0 or more, Fb is set to a number of ¼ or more and ¾ or less. As shown in FIG. 12, the control unit (10) may perform the second control CO2 to back-feed the medium ME1 by backward-rotating the roller (56a, 57a) at a rotation speed Nb+Fb after the first control CO1. Since most rotation shafts of mass-produced rollers (56a, 57a) have slight eccentricity, at the time of forming the authentication image, that the rotation speed at which the roller (56a, 57a) is backward-rotated and that corresponds to the back-feeding being Nb+Fb tends to increase the positional variation of the dots DT1. Therefore, the present aspect can form an output image including an authentication image that is more difficult to copy on a medium.

Aspect 6

As shown in FIG. 13, a liquid 36 discharged as the droplets 37 from the recording head 30 may include a first liquid and a second liquid having higher visibility than that of the first liquid. The control unit (10) may perform a control to form the output image IM1 excluding the authentication image IM2 with a plurality of types of liquids at least including the second liquid, and perform a control to form the authentication image IM2 with the first liquid without using the second liquid. Since the second liquid having higher visibility than that of the first liquid is not used for the authentication image IM2, visibility of the authentication image IM2 is low. Therefore, the present aspect can obtain a high-quality output image.

Here, the plurality of types of liquids for forming the output image excluding the authentication image may include the second liquid, and may or may not include the first liquid. These additional statements are also applied to the following aspects.

For example, in a case 1 of FIG. 13, the first liquid for forming the authentication image IM2 includes liquids of Y (yellow) and CL (clear), and the second liquid having higher visibility than that of the first liquid includes liquids of C (cyan), M (magenta), and K (black). In the case 1, the control unit performs a control to form the output image IM1 excluding the authentication image IM2 with five types of liquids including the second liquid (C, M, K) and the first liquid (Y, CL), and performs a control to form the authentication image IM2 with the first liquid (Y, CL) without using the second liquid (C, M, K).

In a case 2 of FIG. 13, the first liquid for forming the authentication image IM2 is the liquid of CL, and the second liquid having higher visibility than that of the first liquid includes the liquids of C, M, Y, and K. In the case 2, the control unit performs a control to form the output image IM1 excluding the authentication image IM2 with four types of liquids of the second liquid (C, M, Y, K) without using the first liquid (CL), and performs a control to form the authentication image IM2 with the first liquid (CL) without using the second liquid (C, M, Y, K). This case is also included in Aspect 6.

Aspect 7

An image forming method according to one aspect of the present technique is a method for forming, on the medium ME1, the output image IM1 including the authentication image IM2 for authenticity determination by performing the main scanning in which the recording head 30 that discharges the droplets 37 onto the medium ME1 moves in the main scanning direction D1 and the sub scanning in which the medium ME1 is fed in the feeding direction D2. The image forming method includes forming the authentication image IM2 by a plurality of times of the main scanning in which feeding positions of the medium ME1 in the feeding direction D2 are different, in which at least one feeding amount F of the medium ME1 in one sub scanning is different between a feeding amount at the time of forming the authentication image IM2 and a feeding amount at the time of forming the portion of the output image IM1 that does not include the authentication image IM2.

In the aspect described above, the feeding amount F2 of the medium ME1 when the authentication image IM2 is formed is different from the feeding amount F1 of the medium ME1 when the portion of the output image IM1 that does not include the authentication image IM2 is formed, and thus a variation in positions of the dots DT1 generated from the droplets 37 at the time of forming the authentication image is generated. It is difficult to form the same authentication image IM2 even in the same individual image forming apparatus 1, and thus the above aspect can provide an image forming method for forming an output image including an authentication image that is more difficult to copy on a medium.

The present technique is applicable to a system including the above-described image forming apparatus, a control method of the system, a control program of the above-described image forming apparatus, a control program of the above-described system, a computer-readable medium in which any one of the above-described control programs is recorded, and the like. The above-described image forming apparatus may include a plurality of distributed portions.

(2) Specific Example of Authenticity Determination System

To achieve a business of, for example, selling digital copyright data by high-quality printing, it is important to prevent a fake print from being distributed. Although it is also possible to perform authenticity determination by mutual authentication such as NFC including RFID, it is necessary to prepare a special reader for the authenticity determination. Here, the RFID is an abbreviation of radio frequency identification, and the NFC is an abbreviation of near field communication.

The authenticity determination system of this specific example is a system that performs authenticity determination of a printed material by using an authentication pattern of a predetermined region, and a system that determines authenticity based on a variation in droplet landing positions of an image forming apparatus such as an inkjet printer. The authentication pattern is a dot pattern of an authentication image and can be detected by adding a magnifying glass or the like to an imaging device such as a smartphone, so that authenticity can be determined even by a general user. This specific example is characterized in that a recording method different from a normal recording method is implemented to increase a variation in dot formation positions when an authentication image for authenticity determination is printed. As a result, in this specific example, a unique authentication pattern can be printed with a simple mechanism, and the authentication pattern can be used as an anti-counterfeit measure.

First, an example of an authenticity determination system using a printed material PT1 of the output image IM1 including the authentication image IM2 for authenticity determination will be described with reference to FIG. 1. Examples of the printed material PT1 include various tickets issued in stores such as convenience stores and movie theaters, and various certificates issued in institutions such as public offices.

For example, it is assumed that the image forming apparatus 1 is provided in a store that sells tickets having the authentication image IM2. The image forming apparatus 1 may be an inkjet printer dedicated machine or an inkjet multifunctional machine. The ticket is the printed material PT1 in which the output image IM1 including the authentication image IM2 is formed on the medium ME1 such as paper. The image forming apparatus 1 forms a plurality of printed materials PT1, and meanwhile, each authentication image IM2 has a dot pattern different from that of the other authentication images. An owner or employee of the store may capture authentication images IM2 with a terminal TE1 to which a magnifying glass TE1m is attached, and register captured images PH1, PH2, . . . , PHi and so on of the authentication images IM2 in a database DB1. A mobile terminal such as a smartphone or a tablet terminal can be used as the terminal TE1. The database DB1 may be a personal computer or the like provided in the store, or may be a server computer or the like outside the store. The terminal TE1 acquires the captured images PH1, PH2, . . . , PHi and so on by capturing the authentication images IM2, and transmits the captured images PH1, PH2, . . . , PHi, and so on in a wireless or wired manner. When the database DB1 is a server computer outside the store, the terminal TE1 may transmit the captured images PH1, PH2, . . . , PHi and so on to the server computer via a wide area network such as the Internet.

The database DB1 is used to verify an authentication image IM2c of a printed material PT1c to be subjected to authenticity determination. The printed material PT1c has an output image IM1c formed on a medium ME1c. The verification of the authentication image IM2c may be performed at an authentication window of a movie theater or the like, or performed at a store where the tickets are sold. For example, an employee at the authentication window may capture the authentication image IM2c with a terminal TE2 to which a magnifying glass TE2m is attached, and check whether a captured image PHc of the authentication image IM2c matches any of the captured images PH1, PH2, . . . , PHi, and so on in the database DB1. A mobile terminal such as a smartphone or a tablet terminal can be used as the terminal TE2. The terminal TE2 acquires the captured image PHc by capturing the authentication image IM2c, transmits the captured image PHc to the database DB1, and requests the database DB1 to verify the captured image PHc in a wireless or wired manner. The database DB1 receives the captured image PHc and verifies the captured image PHc with the captured images PH1, PH2, . . . , PHi, and so on by pattern matching. Thereafter, the database DB1 transmits to the terminal TE2 that the authentication is completed when the captured image PHc matches any of the captured images PH1, PH2, . . . , PHi, and so on, and transmits to the terminal TE2 that the authentication fails when the captured image PHc does not match any of the captured images PH1, PH2, . . . , PHi, and so on. Therefore, the employee at the authentication window can determine whether the printed material PT1c is genuine or counterfeit.

Figure 2:
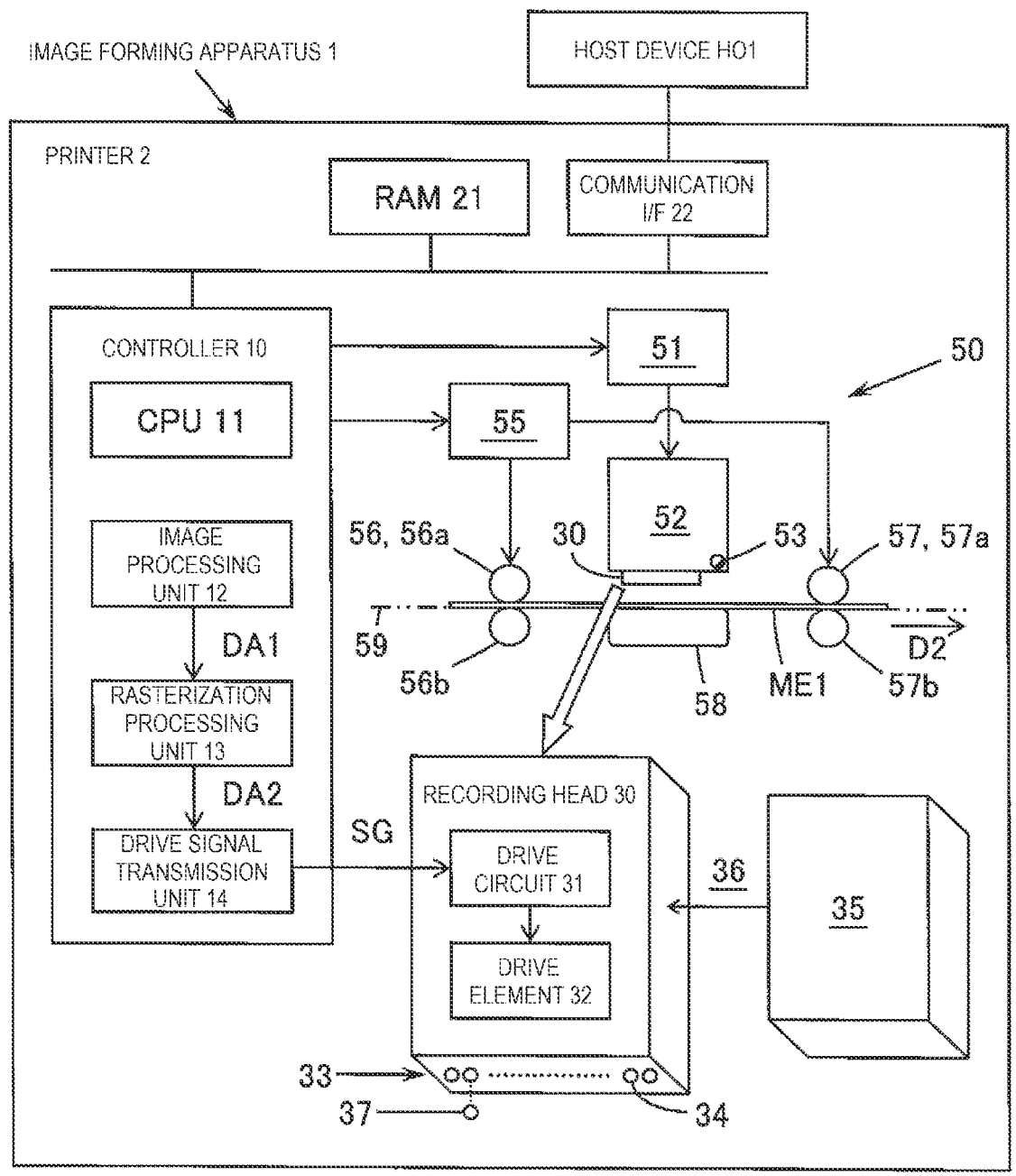
FIG. 2 is a diagram schematically showing an example of an image forming system including an image forming apparatus.

(3) Specific Example of Image Forming System Including Image Forming Apparatus FIG. 2 schematically shows an image forming system SY1 including the image forming apparatus 1. The image forming system SY1 shown in FIG. 2 includes a host device HO1 and a printer 2. The printer 2 of this specific example is an example of the image forming apparatus 1. The image forming system SY1 may include additional elements that are not shown in FIG. 2, and the printer 2 may include additional elements that are not shown in FIG. 2.

The printer 2 shown in FIG. 2 is a serial printer, which is a type of inkjet printer, and includes the controller 10, which is an example of the control unit, a RAM 21, a communication I/F 22, the recording head 30, the drive unit 50, and the like. Here, the RAM is an abbreviation of random access memory, and the I/F is an abbreviation of an interface. The controller 10, the RAM 21, and the communication I/F 22 are connected to a bus, and can input and output information to and from each other.

The controller 10 includes a CPU 11, an image processing unit 12, a rasterization processing unit 13, a drive signal transmission unit 14, and the like. The CPU is an abbreviation of central processing unit. The controller 10 controls the main scanning and the sub scanning performed by the drive unit 50 and the discharge of the droplets 37 performed by the recording head 30 based on the image formation data DA1 representing the output image IM1. The controller 10 can be constituted by a SoC or the like. SoC is an abbreviation of system on a chip.

The CPU 11 mainly performs information processing and control in the printer 2.

The image processing unit 12 generates the image formation data DA1 representing an output image based on a dot formation state from an input image from the host device HO1 or the like. The image formation data DA1 of the present specific example is assumed to be half-tone data representing the dot formation state. The half-tone data may be binary data representing the presence or absence of dot formation, or may be multi-value data of three or more gradations that can correspond to dots in different sizes, such as small dots, medium dots, and large dots. The binary data can be, for example, data in which 1 corresponds that the dot is formed and 0 corresponds that no dot is formed. Four-valued data that can be expressed by two bits for each pixel can be, for example, data in which 3 corresponds to formation of a large dot, 2 corresponds to formation of a medium dot, 1 corresponds to formation of a small dot, and 0 corresponds that no dot is formed.

The image processing unit 12 may include a resolution conversion unit and a color conversion unit. The resolution conversion unit converts a resolution of the input image from the host device HO1 or the like into a set resolution. The input image is represented by, for example, RGB data having an integer value of $2^8$ gradations or $2^{16}$ gradations of R, G, and B in each pixel. Here, R means red, G means green, and B means blue. The color conversion unit refers to, for example, a color conversion lookup table in which correspondence relationships between gradation values of R, G, and B and gradation values of C, M, Y, K, and CL are defined, and converts the RGB data of the set resolution into CMYKCL data having integer values of $2^8$ gradations or $2^{16}$ gradations of C, M, Y, K, and CL for each pixel. Here, C means cyan, M means magenta, Y means yellow, K means black, and CL means clear, that is, non-coloring. The CMYKCL data represents a usage amount of the liquid 36 such as ink for each pixel. The image processing unit 12 reduces the number of gradations of the gradation values by performing predetermined half-tone processing such as a dither method, an error diffusion method, or a density pattern method on the gradation values of the respective pixels constituting the CMYKCL data, and generates the image formation data DA1.

The rasterization processing unit 13 generates raster data DA2 by performing rasterization processing of rearranging the image formation data DA1 in an order in which dots are formed by the drive unit 50. The rasterization processing unit 13 generates the raster data DA2 to form the authentication image IM2 by performing a plurality of times of the main scanning in which the feeding positions of the medium ME1 in the feeding direction D2 are different. The rasterization processing unit 13 of this specific example generates the raster data DA2 so that at least one feeding amount of the medium ME1 in one sub scanning is different between a feeding amount at the time of forming the authentication image IM2 and a feeding amount at the time of forming the portion of the output image IM1 that does not include the authentication image IM2. Details of the processing of the rasterization processing unit 13 will be described later.

The drive signal transmission unit 14 generates a drive signal SG corresponding to a voltage signal to be applied to a drive element 32 of the recording head 30 based on the raster data DA2 and outputs the drive signal SG to a drive circuit 31. For example, when the raster data DA2 is "dot formation", the drive signal transmission unit 14 outputs a drive signal for discharging droplets for the dot formation. In a case where the raster data DA2 is four-valued data, when the raster data DA2 is "large dot formation", the drive signal transmission unit 14 outputs a drive signal for discharging droplets for the large dot, when the raster data DA2 is "medium dot formation", the drive signal transmission unit 14 outputs a drive signal for discharging droplets for the medium dot, and when the raster data DA2 is "small dot formation", the drive signal transmission unit 14 outputs a drive signal for discharging droplets for the small dot.

Each of the units 11 to 14 may be constituted by an ASIC, and may directly read data to be processed from the RAM 21 or directly write processed data to the RAM 21. Here, the ASIC is an abbreviation of application specific integrated circuit.

The drive unit 50 controlled by the controller 10 includes a carriage drive unit 51, a carriage 52, a roller drive unit 55, a pair of transport rollers 56, a pair of paper discharge rollers 57, a platen 58, and the like. The drive unit 50 reciprocates the carriage 52 and the recording head 30 by the driving of the carriage drive unit 51, and feeds the medium ME1 in the feeding direction D2 along a transport path 59 by the driving of the roller drive unit 55. In FIG. 2, the feeding direction D2 is a rightward direction, and a left side is referred to as upstream and a right side is referred to as downstream. The carriage drive unit 51 performs the main scanning for moving the carriage 52 and the recording head 30 in the main scanning direction D1 shown in FIGS. 3, 4 and the like under the control of the controller 10. The roller drive unit 55 rotates rollers 56a, 57a of the pairs of rollers 56, 57 under the control of the controller 10 to perform the sub scanning for feeding the medium ME1 in the feeding direction D2. The medium ME1 is a material for holding a printed image and is generally paper, and may be resin, metal, or the like. A shape of the medium ME1 is generally a rectangular shape or a roll shape, and may be an elliptical shape, a polygonal shape other than the rectangular shape, a three-dimensional shape, or the like.

The recording head 30 is mounted on the carriage 52. The carriage 52 may be equipped with a liquid cartridge 35 that supplies the liquid 36 discharged as the droplets 37 to the recording head 30. It is for sure that the liquid 36 may be supplied from the liquid cartridge 35 provided outside the carriage 52 to the recording head 30 via a tube. The carriage 52 on which the recording head 30 is mounted is fixed to an endless belt (not shown) and is movable in the main scanning direction D1 shown in FIGS. 3, 4 and the like along a guide 53. As shown in FIG. 4, the main scanning direction D1 collectively refers to a forward direction D11 and a backward direction D12 opposite to the forward direction D11. The guide 53 is an elongated member of which a longitudinal direction is oriented in the main scanning direction D1. The carriage drive unit 51 is constituted by a servomotor, and moves the carriage 52 in the forward direction D11 and the backward direction D12 in accordance with a command from the controller 10.

The pair of transport rollers 56 upstream of the recording head 30 includes the drive transport roller 56a that comes into contact with one surface of the medium ME1 and a driven transport roller 56b that comes into contact with the other surface of the medium ME1. At the time of the sub scanning, the pair of transport rollers 56 feeds the nipped medium ME1 to the recording head 30 by the rotation of the drive transport roller 56a. At this time, the driven transport roller 56b is rotated by the movement of the medium ME1.

The pair of paper discharge rollers 57 downstream of the recording head 30 includes a drive paper discharge roller 57a that comes into contact with one surface of the medium ME1 and a driven paper discharge roller 57b that comes into contact with the other surface of the medium ME1. At the time of the sub scanning, the pair of paper discharge rollers 57 transports the nipped medium ME1 to a paper discharge tray (not shown) by the rotation of the drive paper discharge roller 57a. At this time, the driven paper discharge roller 57b is rotated by the movement of the medium ME1.

The roller drive unit 55 is constituted by a servomotor, and rotates the rollers 56a, 57a in accordance with a command from the controller 10. The rollers 56a, 57a rotate to feed the medium ME1 in the feeding direction D2. In this way, the pair of transport rollers 56 and the pair of paper discharge rollers 57 feed the medium ME1 in the feeding direction D2.

The platen 58 supports the medium ME1 on the transport path 59. The recording head 30 controlled by the controller 10 performs printing by discharging the droplets 37 onto the medium ME1 supported by the platen 58. The recording head 30 includes the drive circuit 31, the drive element 32, and the like. The drive circuit 31 applies the voltage signal to the drive element 32 in accordance with the drive signal SG received from the drive signal transmission unit 14. As the drive element 32, a piezoelectric element that applies pressure to the liquid 36 in a pressure chamber communicating with a nozzle 34, a drive element that generates air bubbles in the pressure chamber by heat and discharges the droplets 37 from the nozzle 34, or the like can be used. The nozzle is a small hole through which the droplets 37 such as ink droplets are ejected. The liquid 36 is supplied from the liquid cartridge 35 such as an ink cartridge to the pressure chamber of the recording head 30. A combination of the liquid cartridge 35 and the recording head 30 is provided, for example, for each of C, M, Y, K, and CL. A liquid of CL is used to improve image quality of the output image IM1, and the like. The liquid 36 in the pressure chamber is discharged as the droplets 37 from the nozzle 34 toward the medium ME1 by the drive element 32. As a result, dots of the droplets 37 are formed on the medium ME1. While the recording head 30 repeatedly moves in the main scanning direction D1, dots are formed in accordance with the raster data DA2, and the medium ME1 is fed in a transport direction for performing the sub scanning once so that the output image IM1 is formed on the medium ME1.

The RAM 21 is a large-capacity volatile semiconductor memory and stores input images and the like received from the host device HO1, a memory (not shown), and the like. The communication I/F 22 is coupled to the host device HO1 in a wired or wireless manner and receives and outputs information from and to the host device HO1. The host device HO1 includes a computer such as a personal computer or a tablet terminal, a mobile phone such as a smartphone, a digital camera, a digital video camera, and the like.

Figure 3:
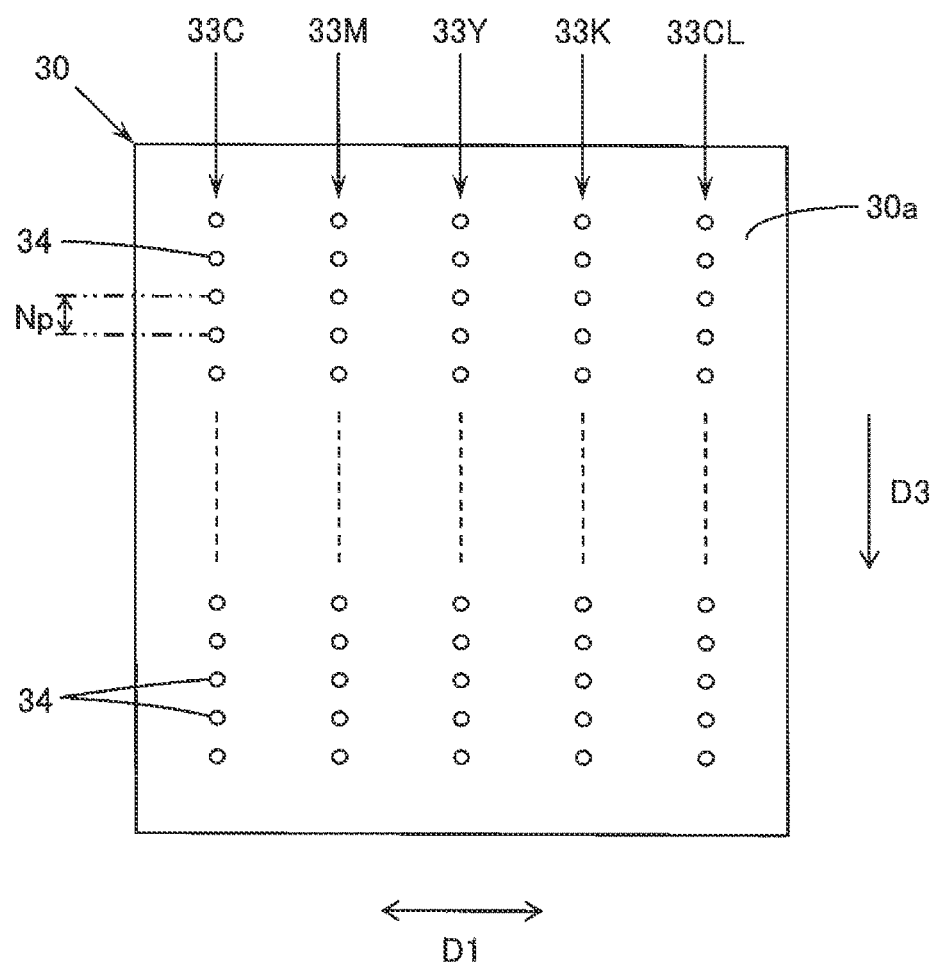
FIG. 3 is a diagram schematically showing an example of a nozzle surface of a recording head.
Figure 4:
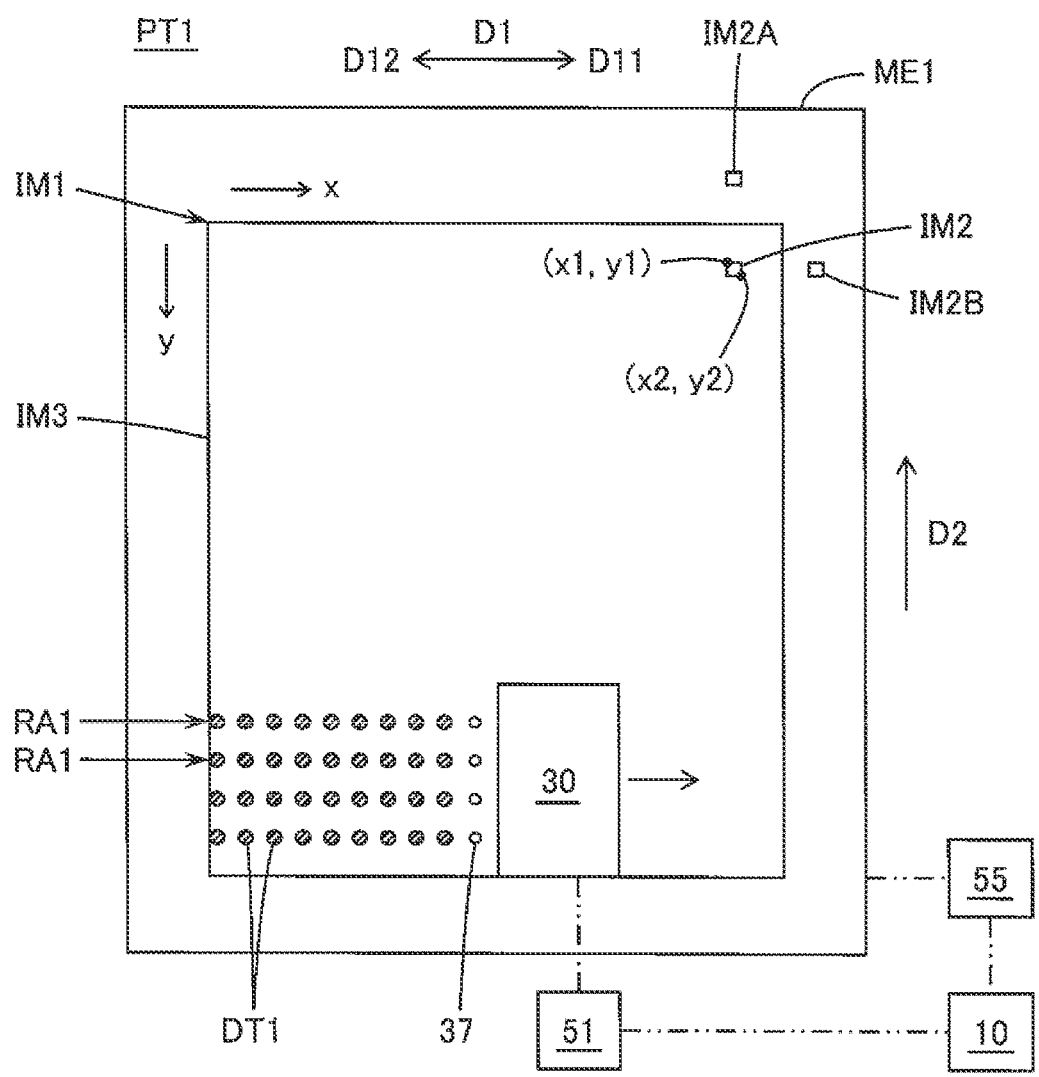
FIG. 4 is a diagram schematically showing an example of a printed material having an output image.

FIG. 3 schematically shows a nozzle surface 30a of the recording head 30. The recording head 30 has, on the nozzle surface 30a, nozzle rows 33 in which a plurality of nozzles 34 are arranged at an interval of a nozzle pitch Np in a nozzle arrangement direction D3. The nozzle arrangement direction D3 shown in FIG. 3 coincides with the feeding direction D2 shown in FIG. 4 and the like, and the nozzle arrangement direction may be shifted in a range of less than 90° from the feeding direction D2. The plurality of nozzles 34 included in the nozzle rows 33 shown in FIG. 3 are arranged in rows, and the plurality of nozzles included in the nozzle rows may be arranged in a staggered manner. The recording head 30 shown in FIG. 3 includes a nozzle row 33C of C, a nozzle row 33M of M, a nozzle row 33Y of Y, a nozzle row 33K of K, and a nozzle row 33CL of CL. It is for sure that the nozzles 34 included in the nozzle row 33C discharge C droplets 37, the nozzles 34 included in the nozzle row 33M discharge M droplets 37, the nozzles 34 included in the nozzle row 33Y discharge Y droplets 37, the nozzles 34 included in the nozzle row 33K discharge K droplets 37, and the nozzles 34 included in the nozzle row 33CL discharge CL droplets 37.

FIG. 4 schematically shows the recording head 30 and the printed material PT1 having the output image IM1. The printed material PT1 is a print result in which the output image IM1 including the authentication image IM2 is formed on the medium ME1. The controller 10 controls the carriage drive unit 51 to execute the main scanning for moving the recording head 30 in the main scanning direction D1, and controls the roller drive unit 55 to execute the sub scanning for feeding the medium ME1 in the feeding direction D2. The controller 10 changes the feeding position of the medium ME1 in the feeding direction D2 in a plurality of times of the main scanning. The controller 10 controls the recording head 30 to discharge the droplets 37 during the main scanning so that dots DT1 of the droplets 37 are formed on the medium ME1, and the dots DT1 are not formed during the sub scanning. A row of the dots DT1 in the main scanning direction D1 is referred to as a raster RA1. By repeatedly forming the dots DT1 on the medium ME1, the output image IM1 is formed on the medium ME1. In a case of performing bidirectional recording, the controller 10 controls the dots DT1 to be formed on the medium ME1 while the recording head 30 moves in the forward direction D11, and also controls the dots DT1 to be formed on the medium ME1 while the recording head 30 moves in the backward direction D12. In a case of performing unidirectional recording, the controller 10 performs control so that the dots DT1 are formed on the medium ME1 while the recording head 30 moves in the forward direction D11, and the dots DT1 are not formed while the recording head 30 moves in the backward direction D12.

Here, a part of the output image IM1 excluding the authentication image is referred to as a normal image IM3. The authentication image IM2 shown in FIG. 4 is within a region of the normal image IM3, and the authentication image may be outside the region of the normal image. For example, as shown in FIG. 4, an authentication image IM2A may be formed in place of the authentication image IM2 or together with the authentication image IM2 at a position on the medium ME1 that extends from the normal image IM3 in the feeding direction D2. An authentication image IM2B may be formed in place of the authentication image IM2 or together with the authentication image IM2 at a position on the medium ME1 that extends from the normal image IM3 in the main scanning direction D1. When the authentication image IM2 is within the region of the normal image IM3, the authentication image IM2 is preferably located at a position where a density of the dots DT1 is low in the normal image IM3.

In this specific example, a position of each pixel of the output image IM1 is represented by an x coordinate corresponding to a position in the main scanning direction D1 and a y coordinate corresponding to a position in the feeding direction D2. It is assumed that the authentication image IM2 shown in FIG. 4 is a rectangular region from start coordinates (x1, y1) to end coordinates (x2, y2), where x1<x2 and y1<y2.

Figure 5:
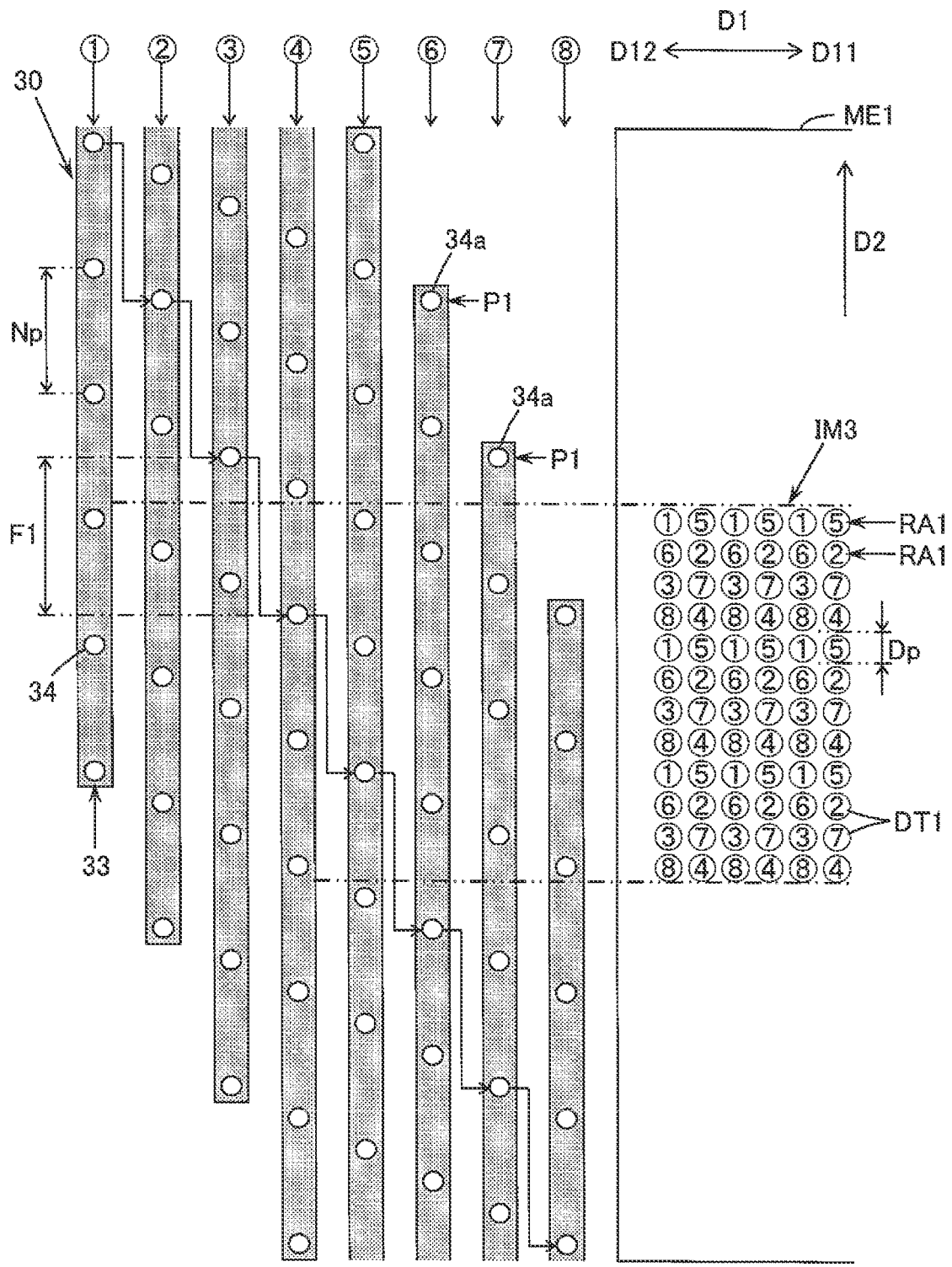
FIG. 5 is a diagram schematically showing an example of a feeding position of a medium and a position of a dot in each pass when a normal image having a portion where no authentication image exists is formed.

FIG. 5 schematically shows feeding positions P1 of the medium ME1 and positions of the dots DT1 in each pass when the normal image IM3 having a portion where no authentication image IM2 exists is formed. One pass means one main scanning when the dots DT1 can be formed on the medium ME1. In FIG. 5, a number of each pass is indicated by a circled number, and the number of the pass at which the dot DT1 is formed is also indicated by the circled number. In the sub scanning, the medium ME1 is fed in the feeding direction D2. In FIG. 5, for easy understanding, a relative position of the recording head 30 with respect to the medium ME1 is shown for each pass, only one of C, M, Y, K, and CL is shown as the nozzle row 33 in the recording head 30 of each pass, and the number of nozzles 34 of the nozzle row 33 is 11. For convenience, in FIG. 5, a position of a nozzle 34a at a downstream end of the nozzle row 33 in the feeding direction D2 is shown as the feeding position P1. The nozzle pitch Np, which is the interval between the nozzles 34 in the nozzle row 33, is four times a dot pitch Dp, which is a minimum interval between the dots DT1 in the feeding direction D2. The inter-pass feeding amount F1 is five times that of the dot pitch Dp. In each raster RA1, all dots DT1 are formed in two passes.

Figure 6:
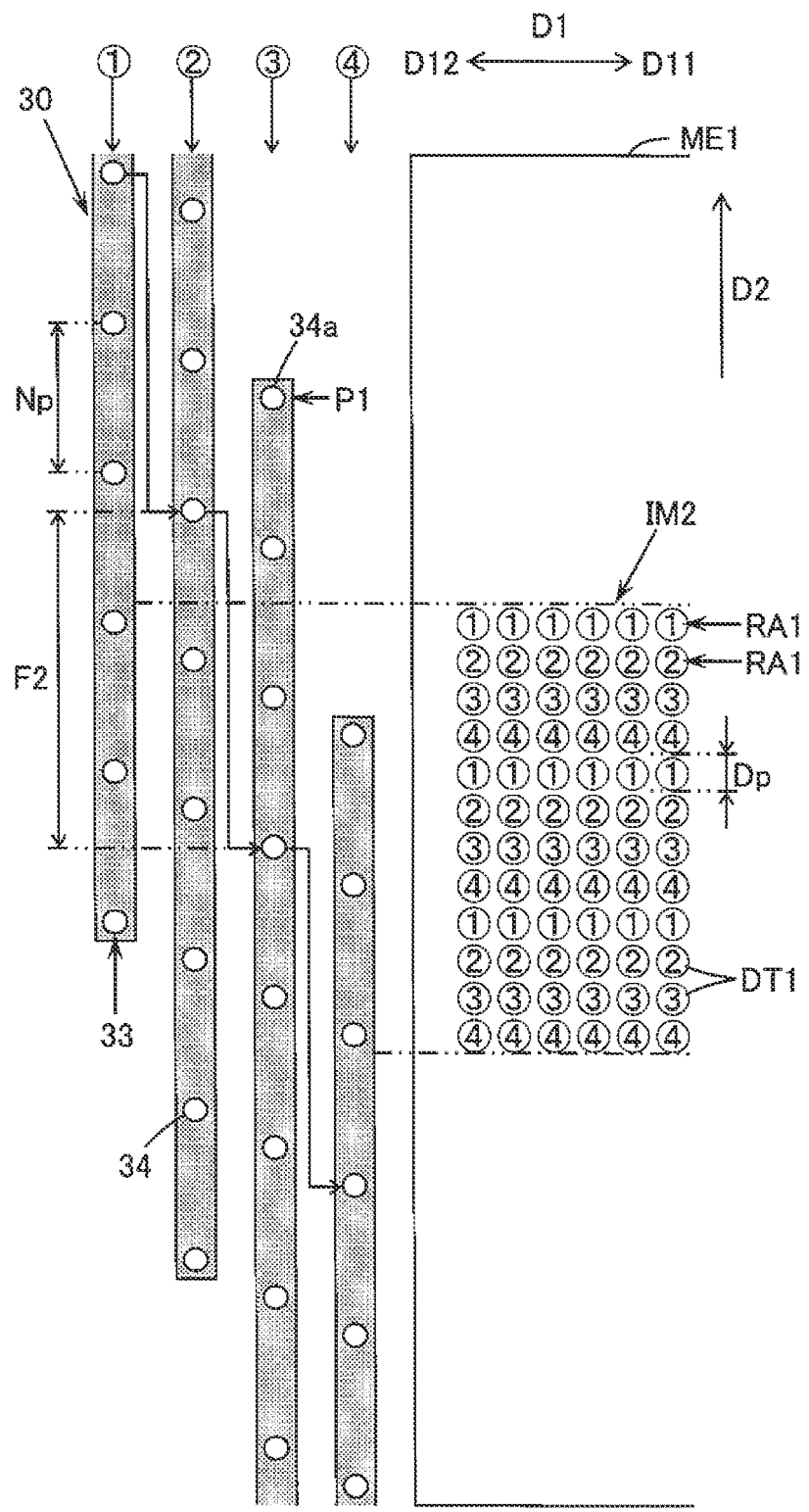
FIG. 6 is a diagram schematically showing an example of a feeding position of a medium and a position of a dot in each pass when the authentication image is formed.

This specific example is characterized in that an inter-pass feeding amount when the authentication image IM2 is formed is changed from the inter-pass feeding amount F1 when the portion of the output image IM1 that does not include the authentication image IM2 is formed. FIG. 6 schematically shows the feeding positions P1 of the medium ME1 and positions of the dots DT1 in each pass when the authentication image IM2 is formed. In order to increase the positional variation of the dots DT1 included in the authentication image IM2, the feeding amount F at the time of forming the authentication image IM2 in both a pass in which recording is performed immediately before the medium ME1 is fed and a pass in which the recording is performed immediately after the medium ME1 is fed may be changed from the feeding amount F1 at the time of not forming the authentication image. The main scanning and the sub scanning may be performed simultaneously when the recording is not performed, that is, when the dots DT1 are not formed on the medium ME1. The feeding amount F1 to be compared is a feeding amount when the portion of the output image IM1 that does not include the authentication image IM2 is formed in both of the pass in which the recording is performed immediately before the medium ME1 is fed and the pass in which the recording is performed immediately after the medium ME1 is fed.

In FIG. 6, the inter-pass feeding amount F2 when the authentication image IM2 is formed is 9 times that of the dot pitch Dp, which is larger than the inter-pass feeding amount F1 when the portion of the output image IM1 that does not include the authentication image IM2 is formed. The example shown in FIG. 6 shows that all the dots DT1 are formed in each raster RA1 in one pass so that the sufficient number of dots DT1 are formed with the feeding amount F2 larger than the feeding amount F1. It is also possible to form the sufficient number of dots DT1 on the medium ME1 at the time of forming the authentication image by narrowing a use range of the nozzles 34 of the recording head 30 in the feeding direction D2 in accordance with an increase in the feeding amount at the time of forming the authentication image.

In addition, a part of the normal image IM3 may be formed in a pass for forming the authentication image IM2. In this case, a part of the normal image IM3 is formed with the feeding amount F2 different from the normal feeding amount F1. However, since a size of one side of the authentication image IM2 is sufficient to be on an order of millimeters, an influence on the image quality due to the change in the feeding amount as viewed in the entire normal image IM3 is small. When the authentication image IM2 is within the region of the normal image IM3, the authentication image IM2 is preferably located at the position where the density of the dots DT1 is low in the normal image IM3, but when the density of the dots DT1 in a portion of the normal image IM3 formed with the pass forming the authentication image IM2 is higher, the influence of the change in the feeding amount can be reduced.

(4) First Specific Example of Processing Performed by Image Forming Apparatus

Figure 7:
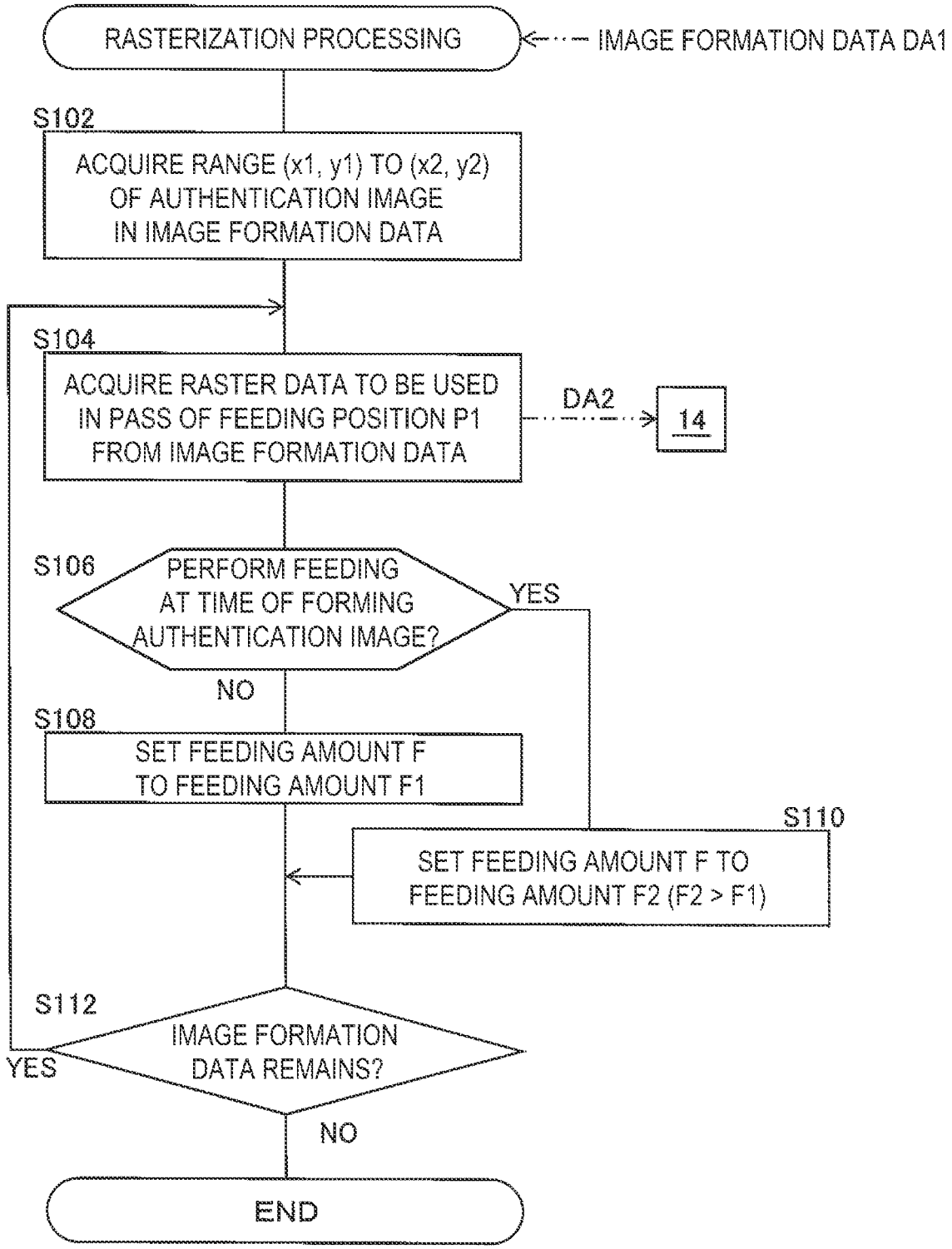
FIG. 7 is a flowchart showing an example of rasterization processing.

Next, a first specific example of processing performed by the printer 2 will be described with reference to FIG. 7 and the like. FIG. 7 shows the rasterization processing performed by the rasterization processing unit 13 of the controller 10 shown in FIG. 2. The rasterization processing shown in FIG. 7 starts when the rasterization processing unit 13 receives the image formation data DA1, which is the half-tone data, from the image processing unit 12. In the example shown in FIG. 7, as shown in FIGS. 5, 6, processing is performed in which the feeding amount F2 at the time of forming the authentication image is larger than the feeding amount F1 at the time of not forming the authentication image.

In step S102, the rasterization processing unit 13 that receives the image formation data DA1 acquires a range of the authentication image IM2 in the image formation data DA1. Hereinafter, the description of "step S" will be omitted. For example, when the rasterization processing unit 13 receives the image formation data DA1 representing the output image IM1 shown in FIG. 4, the rasterization processing unit 13 may acquire the start coordinates (x1, y1) and the end coordinates (x2, y2) of the authentication image IM2 as the range of the authentication image IM2.

Thereafter, in S104, the rasterization processing unit 13 acquires the raster data DA2 to be used in the pass of the feeding position P1 from the image formation data DA1. The raster data DA2 used in the pass of the feeding position P1 is data representing a state of the dots DT1 in a plurality of pixels to be recorded in the pass of the feeding position P1. The rasterization processing unit 13 may pass the raster data DA2 for one pass to the drive signal transmission unit 14 during the rasterization processing. In this case, the controller 10 transmits the drive signal SG from the drive signal transmission unit 14 to the recording head 30 while controlling the driving of the carriage drive unit 51 so that the dots DT1 of the droplets 37 are formed on the medium ME1 based on the corresponding raster data DA2 in the main scanning of the feeding position P1. The rasterization processing unit 13 may pass all the raster data DA2 to the drive signal transmission unit 14 after the rasterization processing.

After the raster data DA2 for one pass is acquired, in S106, the rasterization processing unit 13 branches the processing according to whether the feeding amount F2 at the time of forming the authentication image is fed immediately after the output image IM1 for one pass is formed. In the first specific example, when the authentication image IM2 is formed in both of the pass in which the recording is performed immediately before the medium ME1 is fed and the pass in which the recording is performed immediately after the medium ME1 is fed, the feeding amount is set to the feeding amount F2 at the time of not forming the authentication image, and in other cases, the feeding amount is set to the feeding amount F1.

When the portion of the output image IM1 that does not include the authentication image IM2 is formed in at least one of the pass in which the recording is performed immediately before the medium ME1 is fed and the pass in which the recording is performed immediately after the medium ME1 is fed, the rasterization processing unit 13 proceeds the processing to S108, sets the feeding amount F immediately after the recording of the pass corresponding to S104 to the feeding amount F1, and proceeds the processing to S112. In this case, the controller 10 drives the roller drive unit 55 immediately after the recording of the pass corresponding to S104, thereby executing the sub scanning for feeding the medium ME1 in the feeding direction D2 to set the feeding amount F to the feeding amount F1.

When the authentication image IM2 is formed in both of the pass in which the recording is performed immediately before the medium ME1 is fed and the pass in which the recording is performed immediately after the medium ME1 is fed, the rasterization processing unit 13 proceeds the processing to S110, sets the feeding amount F immediately after the recording of the pass corresponding to S104 to the feeding amount F2 larger than the feeding amount F1, and proceeds the processing to S112. In this case, the controller 10 drives the roller drive unit 55 immediately after the recording of the pass corresponding to S104, thereby executing the sub scanning for feeding the medium ME1 in the feeding direction D2 to set the feeding amount F to the feeding amount F2.

In S112, the rasterization processing unit 13 branches the processing according to whether the image formation data DA1 from which no raster data DA2 is acquired remains. When the image formation data DA1 remains, the rasterization processing unit 13 repeats the processing of S104 to S112. In S104 returned from S112, the rasterization processing unit 13 acquires the raster data DA2 from the image formation data DA1 by shifting the feeding position P1 by the feeding amount F. The raster data DA2 in this case is data representing a state of the dots DT1 in a plurality of pixels for which the recording is performed in a pass obtained by shifting the feeding position P1 by the feeding amount F. It is for sure that, when the processing of S108 is performed, the feeding position P1 is shifted by the feeding amount F1, and when the processing of S110 is performed, the feeding position P1 is shifted by the feeding amount F2.

When the image formation data DA1 does not remain in S112, the rasterization processing unit 13 ends the rasterization processing.

FIG. 8 schematically shows a state in which the feeding amount F at the time of forming the authentication image changes in accordance with the above-described rasterization processing. FIG. 9 schematically shows a state in which the positional variation of the dots DT1 in the authentication image IM2 increases.

In the example shown in FIG. 8, the portion of the output image IM1 that does not include the authentication image IM2 is formed on the medium ME1 with passes 1, 2, 7, 8, and the authentication image IM2 is formed on the medium ME1 together with the normal image IM3 with passes 3, 4, 5, 6. In this case, the feeding amount F between the passes 1, 2, the feeding amount F between the passes 2, 3, the feeding amount F between the passes 6, 7, and the feeding amount F between the passes 7, 8 are set to the feeding amount F1. On the other hand, the feeding amount F between the passes 3, 4, the feeding amount F between the passes 4, 5, and the feeding amount F between the passes 5, 6 are set to the feeding amount F2 larger than the feeding amount F1.

When the medium ME1 is fed in the feeding direction D2 by at least one of the pairs of rollers 56, 57 shown in FIG. 2, a slip occurs between the drive transport roller 56a and the medium ME1 or a slip occurs between the drive paper discharge roller 57a and the medium ME1, and thereby a feeding error of the medium ME1 is generated. Since the feeding error occurs due to the slips between the rollers 56a, 57a and the medium ME1, the feeding error may be different for each feed of the medium ME1. When the feeding amount F increases, the feeding error tends to increase, and a variation of the feeding error generated for each feed also tends to increase.

Here, as shown in FIG. 9, it is assumed that formation positions of the dots DT1 vary due to the feeding error of the medium ME1 in a certain raster RA1a. In FIG. 9, a broken line indicates a position of the dot DT1 formed when there is no positional variation in the raster RA1a. As shown in an upper half of FIG. 9, in the feeding amount F1, it is assumed that an error E1 occurs in the formation position of the dot DT1 of the raster RA1a in a direction opposite to the feeding direction D2. When the authentication image is formed, since the inter-pass feeding amount F2 is larger than the feeding amount F1 at the time of not forming the authentication image, an error E2 occurring at the formation position of the dot DT1 of the raster RA1a is larger than the error E1 at the time of not forming the authentication image. Since the error E2 occurs due to the slips between the rollers 56a, 57a and the medium ME1, a variation of the error E2 occurring for each feed increases. Therefore, even when the output image IM1 including the authentication image IM2 is formed on the medium ME1 by the same individual printer 2, the dot pattern of the authentication image IM2 is a unique pattern different for each printed material PT1, and it is difficult to reproduce the dot pattern. Therefore, in this specific example, it is possible to form an output image including an authentication image that is more difficult to copy on a medium with a simple mechanism, and it is possible to determine authenticity of a printed material even when the same individual image forming apparatus is used.

The authenticity of the printed material can be determined by the authenticity determination system as shown in FIG. 1.

(5) Second Specific Example of Processing Performed by Image Forming Apparatus

A method for increasing the variation in the dot pattern of the authentication image IM2 is not limited to the example in which the feeding amount F2 at the time of forming the authentication image is larger than the feeding amount F1 at the time of not forming the authentication image. For example, it is also possible to increase the variation in the dot pattern of the authentication image IM2 by controlling rotation speeds of the drive transport roller 56a and the drive paper discharge roller 57a at the time of the sub scanning. This is because the mass-produced rollers 56a, 57a have eccentricity.

Figure 10:
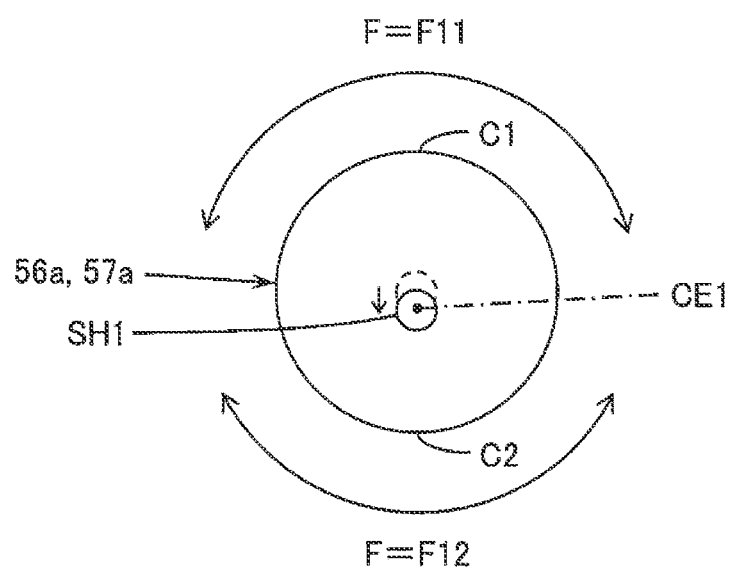
FIG. 10 is a diagram schematically showing an example in which the feeding amount varies due to eccentricity of a roller.

FIG. 10 schematically shows a state in which the feeding amount F varies due to the eccentricity of the rollers 56a, 57a. FIG. 10 collectively shows the drive transport roller 56a and the drive paper discharge roller 57a. For easy understanding, FIG. 10 exaggeratedly shows the eccentricity of the rollers 56a, 57a. A shaft SH1 of the rollers 56a, 57a shown in FIG. 10 is shifted downward. The shaft SH1 is a member that is rotationally driven by the roller drive unit 55. Therefore, a shaft core CE1 of the rollers 56a, 57a is shifted downward. In an outer periphery of the rollers 56a, 57a, a feeding amount F11 when a portion C1 far from the shaft core CE1 is in contact with the medium ME1 is relatively large, and a feeding amount F12 when a portion C2 close to the shaft core CE1 is in contact with the medium ME1 is relatively small. Since it is not known which portion of the outer periphery of the rollers 56a, 57a is in contact with the medium ME1, the feeding amount F varies most when the rollers 56a, 57a are rotated at Na+½. Here, the number Na is an integer of 0 or more and is often 0.

Actually, it is assumed that the rotation speed of the rollers 56a, 57a corresponding to the feeding amount at the time of forming the authentication image cannot be limited to Na+½. Therefore, in the second specific example, Fa is set to a number of ¼ or more and ¾ or less, and the rotation speed of the rollers 56a, 57a corresponding to the feeding amount at the time of forming the authentication image is limited to Na+Fa. The reasons are as follows.

A roughest resolution of a printed image of matte paper or photographic paper is 720 dpi. When the nozzle pitch Np of the nozzle row having a length of one inch is equivalent to 180 dpi, at least four passes are required in order to form the printed image. When the rollers 56a, 57a having a circumferential length of one inch are used, the rotation speed of the rollers 56a, 57a corresponding to a largest feeding amount is ¼. In consideration of an error of the rotational position of the rollers 56a, 57a corresponding to the maximum±one feeding amount, the rotation speed of the rollers 56a, 57a corresponding to the feeding amount at the time of forming the authentication image may be limited to Na+Fa.

On the other hand, the rotation speed of the rollers 56a, 57a corresponding to the feeding amount at the time of not forming the authentication image may not be limited to Na+Fa.

FIG. 11 shows another rasterization processing performed by the rasterization processing unit 13 of the controller 10 shown in FIG. 2. In the rasterization processing shown in FIGS. 11, S108 and S110 in the rasterization processing shown in FIG. 7 are replaced by S208 and S210. A hardware configuration of the image forming system SY1 is as shown in FIGS. 2 to 4, and authenticity of a printed material can be determined by the authenticity determination system shown in FIG. 1.

When the rasterization processing unit 13 acquires the range of the authentication image IM2 in S102 and acquires the raster data DA2 to be used for the pass of the feeding position P1 in S104, the rasterization processing unit 13 branches the processing according to whether to feed the feeding amount F2 at the time of forming the authentication image in S106. In the second specific example, when the authentication image IM2 is formed in both of the pass in which the recording is performed immediately before the medium ME1 is fed and the pass in which the recording is performed immediately after the medium ME1 is fed, the rotation speed of the rollers 56a, 57a is limited to Na+Fa, and in other cases, the rotation speed of the rollers 56a, 57a is not limited to Na+Fa.

When the portion of the output image IM1 that does not include the authentication image IM2 is formed in at least one of the pass in which the recording is performed immediately before the medium ME1 is fed and the pass in which the recording is performed immediately after the medium ME1 is fed, the rasterization processing unit 13 proceeds the processing to S208, sets the rotation speed of the rollers 56a, 57a immediately after the recording of the pass corresponding to S104 to a normal rotation speed, and proceeds the processing to S112. The normal rotation speed means a rotation speed that is not limited to Na+Fa, and a rotation speed that is not represented by Na+Fa is preferable. When Na=0, the normal rotation speed is preferably a rotation speed larger than 0 and smaller than ¼, or a rotation speed larger than ¾ and equal to or smaller than 1, and may be equal to or larger than ¼ and equal to or smaller than ¾ for convenience of feeding. In S208, the controller 10 controls the roller drive unit 55 to rotate the rollers 56a, 57a at the normal rotation speed immediately after the recording of the pass corresponding to S104, thereby executing the sub scanning for feeding the medium ME1 in the feeding direction D2.

When the authentication image IM2 is formed in both of the pass in which the recording is performed immediately before the medium ME1 is fed and the pass in which the recording is performed immediately after the medium ME1 is fed, the rasterization processing unit 13 proceeds the processing to S210, sets the rotation speed of the rollers 56a, 57a immediately after the recording of the pass corresponding to S104 to Na+Fa, and proceeds the processing to S112. When Na=0, the rotation speed of the rollers 56a, 57a is limited to Fa=¼ to ¾. In S210, the controller 10 controls the roller drive unit 55 to rotate the rollers 56a, 57a at the rotation speed Na+Fa immediately after the recording of the pass corresponding to S104, thereby executing the sub scanning for feeding the medium ME1 in the feeding direction D2.

The processing of S104 to S106, S208, S210, S112 are repeated while the image formation data DA1 remains.

At the time of forming the authentication image, since the rotation speed of the rollers 56a, 57a corresponding to the feeding amount F is Na+Fa, the positional variation of the dots DT1 tends to increase. Therefore, even when the output image IM1 including the authentication image IM2 is formed on the medium ME1 by the same individual printer 2, the dot pattern of the authentication image IM2 becomes a unique pattern different for each printed material PT1, and it is difficult to reproduce the dot pattern. Therefore, also in this specific example, it is possible to form an output image including an authentication image that is more difficult to copy on a medium with a simple mechanism, and it is possible to determine authenticity of a printed material even when the same individual image forming apparatus is used.

(6) Third Specific Example of Processing Performed by Image Forming Apparatus

In order to increase the variation in the dot pattern of the authentication image IM2, processing of forming the authentication image IM2 after back-feeding the medium ME1 may be performed.

FIG. 12 schematically shows a state in which the authentication image IM2 is formed on the medium ME1 after back-feeding the medium ME1 on which the normal image IM3 is formed. The hardware configuration of the image forming system SY1 is as shown in FIGS. 2 to 4, and authenticity of a printed material can be determined by the authenticity determination system shown in FIG. 1.

First, the controller 10 performs the first control CO1 to form the normal image IM3 on the medium ME1 based on data of the image formation data DA1 that represents the normal image IM3. As described above, the normal image IM3 is an image obtained by removing the authentication image IM2 from the output image IM1. When the normal image IM3 is formed, the medium ME1 is repeatedly fed in the feeding direction D2 by repeating the sub scanning by forward rotating the rollers 56a, 57a.

After the first control CO1, the controller 10 performs the second control CO2 to back-feed the medium ME1 from the start coordinates (x1, y1) of the authentication image IM2 to the feeding position at which the authentication image IM2 can be formed by backward rotating the rollers 56a, 57a.

After the second control CO2, the controller 10 performs the third control CO3 to form the authentication image IM2 on the medium ME1 having the normal image IM3. When the authentication image IM2 is formed, the medium ME1 is repeatedly fed in the feeding direction D2 by repeating the sub scanning by forward rotating the rollers 56a, 57a. The controller 10 performs a control to form the authentication image IM2 by a plurality of times of the main scanning in which the feeding positions of the medium ME1 in the feeding direction D2 are different, and performs a control so that at least one feeding amount F of the medium ME1 in one sub scanning is different between a feeding amount at the time of forming the authentication image IM2 and a feeding amount at the time of forming the portion of the output image IM1 that does not include the authentication image IM2. Accordingly, a variation in the positions of the dots DT1 generated from the droplets 37 at the time of forming the authentication image is generated.

Immediately after the rollers 56a, 57a are backward rotated in the second control CO2, the medium ME1 sandwiched between the pairs of rollers 56, 57 is held by the pairs of rollers 56, 57 in a state where a force is applied in a direction opposite to the feeding direction D2. In this state, immediately after a first pass of the authentication image formation is performed and the forward rotation of the rollers 56a, 57a that corresponds to the feeding amount F is performed, the medium ME1 sandwiched between the pairs of rollers 56, 57 is held by the pairs of rollers 56, 57 in a state where a force is applied in the feeding direction D2. Therefore, a variation in the formation positions of the dots DT1 is large between the first pass and a second pass. As described above, when the medium ME1 is back-fed, an error is likely to occur in the feeding position of the medium ME1, and thus the positional variation of the dots DT1 of the authentication image IM2 increases. Therefore, in this specific example, it is possible to form an output image including an authentication image that is more difficult to copy on a medium with a simple mechanism, and it is possible to determine authenticity of a printed material even when the same individual image forming apparatus is used.

In the second control CO2, the controller 10 may limit the rotation speed of the backward rotation of the rollers 56a, 57a that corresponds to the feeding amount in the back-feeding to Nb+Fb. Here, the number Nb is an integer equal to or greater than 0, and Fb is a number equal to or greater than ¼ and equal to or less than ¾. In this case, the controller 10 performs the second control CO2 to back-feed the medium ME1 by backward rotating the rollers 56a, 57a at the rotation speed Nb+Fb after the first control CO1.

As described above, since the mass-produced rollers 56a, 57a have eccentricity, when the authentication image is formed, the rotation speed of the backward rotation of the rollers 56a, 57a that corresponds to the back-feeding is Nb+Fb, and thus the positional variation of the dots DT1 tends to increase. Therefore, by backward rotating the rollers 56a, 57a at the rotation speed Nb+Fb, it is possible to form an output image including an authentication image that is more difficult to copy on the medium.

When the controller 10 performs the control to form the authentication image IM2 by a plurality of times of the main scanning in which the feeding positions of the medium ME1 are different, the controller 10 may perform a control to repeatedly feed the medium ME1 in the direction opposite to the feeding direction D2 by repeating the sub scanning in the opposite direction by backward rotating the rollers 56a, 57a. Since the authentication image IM2 is formed not by the normal sub scanning but by repeating the sub scanning in the opposite direction, the positional variation of the dots DT1 generated from the droplets 37 at the time of forming the authentication image increases, and the output image including the authentication image that is more difficult to copy is formed on the medium.

Further, when the controller 10 performs a control to form the authentication image IM2 by a plurality of times of the main scanning in which the feeding positions of the medium ME1 are different, the controller 10 may mix the sub scanning in a normal direction and the sub scanning in the opposite direction. For example, after performing the second control CO2 to back-feed the medium ME1, the controller 10 may execute the sub scanning in the normal direction between recording of the first pass and recording of the second pass, execute the sub scanning in the opposite direction between the recording of the second pass and recording of a third pass, and execute the sub scanning in the normal direction between the recording of the third pass and recording of a fourth pass. The controller 10 can mix the sub scanning in the normal direction and the sub scanning in the opposite direction by various methods, such as executing the sub scanning in the normal direction twice and then executing the sub scanning in the opposite direction, in addition to alternately executing the sub scanning in the normal direction and the sub scanning in the opposite direction. When the direction of the sub scanning is changed, an error is likely to occur in the feeding position of the medium ME1, and thus the positional variation of the dots DT1 of the authentication image IM2 increases, and an output image including an authentication image that is more difficult to copy is formed on the medium.

(7) Fourth Specific Example of Processing Performed by Image Forming Apparatus

In order to make the authentication image IM2 inconspicuous, a type of the liquid used for forming the authentication image IM2 may be different from a type of the liquid used for forming the normal image IM3. The hardware configuration of the image forming system SY1 is as shown in FIGS. 2 to 4, and authenticity of a printed material can be determined by the authenticity determination system shown in FIG. 1.

FIG. 13 schematically shows types of the liquid 36 discharged as the droplets 37 at the time of forming the normal image and types of the liquid 36 discharged as the droplets 37 at the time of forming the authentication image.

For example, in a case 1 of FIG. 13, the liquids of C, M, Y, K, and CL are used for forming the normal image IM3, and the liquids of Y, CL are used for forming the authentication image IM2. In the case 1, the first liquid includes the liquids of Y, CL. The second liquid having higher visibility than that of the first liquid includes the liquids of C, M, and K that excludes the first liquid from the liquids of C, M, Y, K, and CL for forming the normal image. The controller 10 performs a control to form the normal image IM3 with five types of liquids including the second liquid including the liquids C, M, and K and the first liquid including the liquids Y, CL, and performs a control to form the authentication image IM2 with the first liquid including the liquids Y, CL without using the second liquid including the liquids C, M, and K. As described above, the normal image IM3 is the output image IM1 excluding the authentication image IM2.

Visibility of the liquid 36 discharged as the droplets 37 from the recording head 30 can be quantified by, for example, brightness of the dots DT1 of the droplets 37 formed on the medium ME1 at a constant recording density. The constant recording density means the number of dots DT1 formed per unit area of the medium ME1. When dots in a plurality of sizes are formed on the medium ME1, the recording density is the number of dots per unit area when the dots are converted into the largest dot. The brightness can be represented by $L^*$ in CIE $L^*a^*b^*$ color space defined by International Commission on Illumination, and can be measured by a commercially available colorimeter.

The higher the brightness of the dots DT1 is, the lower the visibility of the liquid 36 is, and the lower the brightness of the dots DT1 is, the higher the visibility of the liquid 36 is. When the liquids of C, M, Y, K, and CL are used, as for the brightness of the dots DT1, dots of the liquid CL have a highest brightness, dots of the liquid Y have a second highest brightness, and dots of the liquid K have a lowest brightness. Accordingly, as for the visibility of the liquid 36, the dots of the liquid CL have a lowest visibility, the dots of the liquid Y have a second lowest visibility, and the dots of the liquid K have a highest visibility.

In the case 1, since the second liquid including the liquids C, M, and K and having higher visibility than that of the first liquid including the liquids Y, CL are not used for the authentication image IM2, visibility of the authentication image IM2 is low. Therefore, a printed material having the high-quality output image IM1 is obtained.

In a case 2 of FIG. 13, the liquids of C, M, Y, and K are used for forming the normal image IM3, and the liquid of CL is used for forming the authentication image IM2. In the case 2, the first liquid is the liquid of CL. The second liquid includes the liquids of C, M, Y, and K for forming the normal image. The controller 10 performs a control to form the normal image IM3 with the second liquid including the liquids of C, M, Y, and K without using the first liquid of the liquid of CL, and performs a control to form the authentication image IM2 with the first liquid of the liquid of CL without using the second liquid including the liquids of C, M, Y, and K. In the case 2, since the second liquid including the liquids C, M, Y, and K and having higher visibility than that of the first liquid of the liquid of CL are not used for the authentication image IM2, the visibility of the authentication image IM2 is low. Therefore, a printed material having the high-quality output image IM1 is obtained.

In a case 3 of FIG. 13, the liquids of C, M, Y, and K are used for forming the normal image IM3, and the liquids of Y, CL are used for forming the authentication image IM2. In the case 3, the first liquid includes the liquids of Y, CL. The second liquid includes the liquids of C, M, and K that excludes the liquid of Y from the liquids of C, M, Y, and K for forming the normal image. The controller 10 performs a control to form the normal image IM3 with four types of liquids including the second liquid including the liquids C, M, and K and the liquid of Y, and performs a control to form the authentication image IM2 with the first liquid including the liquids Y, CL without using the second liquid including the liquids C, M, and K. In the case 3, since the second liquid including the liquids C, M, and K and having higher visibility than that of the first liquid including the liquids Y, CL are not used for the authentication image IM2, the visibility of the authentication image IM2 is low. Therefore, a printed material having the high-quality output image IM1 is obtained.

The first and second liquids can also be applied when the recording head 30 does not have a nozzle that discharges the liquid of CL. In a case 4 of FIG. 13, the liquids of C, M, Y, and K are used for forming the normal image IM3, and the liquid of Y is used for forming the authentication image IM2. In the case 4, the first liquid is the liquid of Y. The second liquid includes the liquids of C, M, and K that excludes the first liquid of the liquid of Y from the liquids of C, M, Y, and K for forming the normal image. The controller 10 performs a control to form the normal image IM3 with four types of liquids including the second liquid including the liquids C, M, and K and the first liquid of the liquid of Y, and performs a control to form the authentication image IM2 with the first liquid of the liquid of Y without using the second liquid including the liquids C, M, and K. In the case 4, since the second liquid including the liquids C, M, and K and having higher visibility than that of the first liquid of the liquid of Y is not used for the authentication image IM2, the visibility of the authentication image IM2 is low. Therefore, a printed material having the high-quality output image IM1 is obtained.

The first and second liquids can also be applied when the recording head 30 has nozzles that discharge liquids of colors other than C, M, Y, K, and CL. For example, it is assumed that the recording head 30 has nozzles that discharge liquid of C, M, Y, K, Lc, and Lm. Here, Lc means light cyan which is lighter than C, and Lm means light magenta which is lighter than M. In a case 5 of FIG. 13, the liquids of C, M, Y, K, Lc, and Lm are used for forming the normal image IM3, and the liquids of Y, Lc, and Lm are used for forming the authentication image IM2. In the case 5, the first liquid includes the liquids of Y, Lc, and Lm. The second liquid includes the liquids of C, M, and K that excludes the first liquid including the liquids of Y, Lc, and Lm from the liquids of C, M, Y, K, Lc, and Lm for forming the normal image. The controller 10 performs a control to form the normal image IM3 with six types of liquids including the second liquid including the liquids C, M, and K and the first liquid including the liquids of Y, Lc, and Lm, and performs a control to form the authentication image IM2 with the first liquid including the liquids of Y, Lc, and Lm without using the second liquid including the liquids C, M, and K. In the case 5, since the second liquid including the liquids C, M, and K and having higher visibility than that of the first liquid including the liquids of Y, Lc, and Lm are not used for the authentication image IM2, the visibility of the authentication image IM2 is low, and the colorful authentication image IM2 can be formed by the first liquid including the liquids of Y, Lc, and Lm. Therefore, a printed material having the high-quality output image IM1 is obtained.

(8) Modification

Various modifications are conceivable for the present disclosure.

For example, at least a part of the above-described processing may be performed by the host device HO1. When the host device HO1 can generate the image formation data DA1, which is half-tone data, the host device HO1 may transmit the image formation data DA1 to the printer 2, and the printer 2 that receives the image formation data DA1 may perform the rasterization processing on the image formation data DA1. When the host device HO1 includes a rasterization processing unit, the host device HO1 may generate the raster data DA2 based on the image formation data DA1 and transmit the raster data DA2 to the printer 2, and the printer 2 that receives the raster data DA2 may form the output image IM1 including the authentication image IM2 on the medium ME1 based on the raster data DA2. This case is an example of the image forming apparatus 1 that is a combination of the host device HO1 and the printer 2.

(9) Conclusion

As described above, according to the present disclosure, it is possible to provide a technique and the like capable of forming an output image including an authentication image that is more difficult to copy on a medium by various aspects. It is for sure that the above-described basic functions and effects can be obtained even with a technique including only the constituent requirements according to the independent claims.

In addition, it is also possible to implement a configuration in which configurations disclosed in the above-described examples are replaced with each other or a combination thereof is changed, a configuration in which configurations disclosed in the known technology and the examples described above are replaced with each other or a combination thereof is changed, and the like. The present disclosure also includes these configurations and the like.

What is claimed is:

1. An image forming apparatus that forms an output image including an authentication image for authenticity determination on a medium, the image forming apparatus comprising:
   a recording head configured to discharge a droplet onto the medium;
   a drive unit configured to perform main scanning in which the recording head moves in a main scanning direction and sub scanning in which the medium is fed in a feeding direction; and
   a control unit configured to control, based on image formation data representing the output image, the main scanning and the sub scanning performed by the drive unit, and the discharge of the droplet performed by the recording head, wherein
   the control unit performs a control to form the authentication image by a plurality of times of the main scanning in which feeding positions of the medium in the feeding direction are different, and performs a control so that at least one feeding amount of the medium in one sub scanning is different between a feeding amount at time of forming the authentication image and a feeding amount at time of forming a portion of the output image that does not include the authentication image.

2. The image forming apparatus according to claim 1, wherein
   the control unit performs a control so that the feeding amount when the authentication image is formed is larger than the feeding amount when the portion of the output image that does not include the authentication image is formed.

3. The image forming apparatus according to claim 1, wherein,
   the drive unit includes a roller that rotates to feed the medium in the feeding direction, and
   Na is set to an integer of 0 or more, Fa is set to a number of ¼ or more and ¾ or less, the control unit limits a rotation speed of the roller that corresponds to the feeding amount at the time of forming the authentication image to Na+Fa, and does not limit a rotation speed of the roller that corresponds to the feeding amount at the time of forming the portion of the output image that does not include the authentication image to Na+Fa.

4. The image forming apparatus according to claim 1, wherein
   the control unit performs a first control to form the output image excluding the authentication image on the medium, performs a second control to back-feed the medium after the first control, and performs a third control to form the authentication image on the medium after the second control.

5. The image forming apparatus according to claim 4, wherein
the drive unit includes a roller that rotates to feed the medium in the feeding direction, and
Na is set to an integer of 0 or more, Fb is set to a number of ¼ or more and ¾ or less, the control unit performs the second control to back-feed the medium by backward rotating the roller at the rotation speed Nb+Fb after the first control.

6. The image forming apparatus according to claim 1, wherein
a liquid discharged as the droplet from the recording head includes a first liquid and a second liquid having higher visibility than that of the first liquid, and
the control unit performs a control to form the output image excluding the authentication image with a plurality of types of liquids at least including the second liquid, and performs a control to form the authentication image with the first liquid without using the second liquid.

7. An image forming method for forming an output image including an authentication image for authenticity determination on a medium by performing main scanning in which a recording head that discharges a droplet onto the medium moves in a main scanning direction and sub scanning in which the medium is fed in a feeding direction, the image forming method comprising:
forming the authentication image by a plurality of times of the main scanning in which feeding positions of the medium in the feeding direction are different, wherein
at least one feeding amount of the medium in one sub scanning is different between a feeding amount at time of forming the authentication image and a feeding amount at time of forming a portion of the output image that does not include the authentication image.

\* \* \* \* \*